US009065800B2

(12) United States Patent
Devarajan et al.

(10) Patent No.: US 9,065,800 B2
(45) Date of Patent: Jun. 23, 2015

(54) DYNAMIC USER IDENTIFICATION AND POLICY ENFORCEMENT IN CLOUD-BASED SECURE WEB GATEWAYS

(71) Applicants: Srikanth Devarajan, San Jose, CA (US); Sridhar Narasimhan, Bangalore (IN); Amit Sinha, San Jose, CA (US); Manoj Apte, San Jose, CA (US)

(72) Inventors: Srikanth Devarajan, San Jose, CA (US); Sridhar Narasimhan, Bangalore (IN); Amit Sinha, San Jose, CA (US); Manoj Apte, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 251 days.

(21) Appl. No.: 13/728,631

(22) Filed: Dec. 27, 2012

(65) Prior Publication Data

US 2014/0026179 A1 Jan. 23, 2014

Related U.S. Application Data

(63) Continuation-in-part of application No. 13/051,519, filed on Mar. 18, 2011, now Pat. No. 8,763,071, and a continuation-in-part of application No. 13/206,337, filed on Aug. 9, 2011, and a continuation-in-part of application No. 13/243,807, filed on Sep. 23, 2011, and a continuation-in-part of application No. 13/315,002, filed on Dec. 8, 2011.

(51) Int. Cl.
*H04L 29/06* (2006.01)
*G06F 21/51* (2013.01)
*G06F 21/56* (2013.01)

(52) U.S. Cl.
CPC ............ *H04L 63/0227* (2013.01); *G06F 21/51* (2013.01); *G06F 21/56* (2013.01)

(58) Field of Classification Search
CPC .... H04L 63/0227; H04L 63/20; H04W 12/08
USPC ..................... 726/1, 3, 23; 709/223
See application file for complete search history.

(56) References Cited

U.S. PATENT DOCUMENTS

| 7,543,052 | B1 * | 6/2009 | Cesa Klein ................. 709/224 |
| 7,894,350 | B2 | 2/2011 | Kailash et al. |
| 7,899,849 | B2 | 3/2011 | Chaudhry et al. |
| 7,921,089 | B2 | 4/2011 | Kailash et al. |
| 7,984,102 | B1 | 7/2011 | Raphel et al. |
| 8,010,085 | B2 | 8/2011 | Apte et al. |
| 8,010,526 | B1 | 8/2011 | Kailash et al. |
| 8,024,782 | B2 | 9/2011 | Kailash et al. |
| 8,055,767 | B1 | 11/2011 | Forristal |

(Continued)

*Primary Examiner* — Jamal Javaid
(74) *Attorney, Agent, or Firm* — Clements Bernard PLLC; Lawrence A. Baratta, Jr.; Christopher L. Bernard

(57) ABSTRACT

A cloud-based secure Web gateway, a cloud-based secure Web method, and a network deliver a secure Web gateway (SWG) as a cloud-based service to organizations and provide dynamic user identification and policy enforcement therein. As a cloud-based service, the SWG systems and methods provide scalability and capability of accommodating multiple organizations therein with proper isolation therebetween. There are two basic requirements for the cloud-based SWG: (i) Having some means of forwarding traffic from the organization or its users to the SWG nodes, and (ii) Being able to authenticate the organization and users for policy enforcement and access logging. The SWG systems and methods dynamically associate traffic to users regardless of the source (device, location, encryption, application type, etc.), and once traffic is tagged to a user/organization, various polices can be enforced and audit logs of user access can be maintained.

18 Claims, 31 Drawing Sheets

(56) References Cited

U.S. PATENT DOCUMENTS

| | | |
|---|---|---|
| 8,185,510 B2 | 5/2012 | Chaudhry et al. |
| 8,205,264 B1 | 6/2012 | Kailash et al. |
| 8,230,506 B1 | 7/2012 | Forristal |
| 8,276,202 B1 * | 9/2012 | Dubrovsky et al. ............. 726/22 |
| 2009/0177514 A1 | 7/2009 | Hudis et al. |
| 2010/0077444 A1 | 3/2010 | Forristal |
| 2010/0088150 A1 | 4/2010 | Mazhar et al. |
| 2010/0125903 A1 | 5/2010 | Devarajan et al. |
| 2010/0212010 A1 | 8/2010 | Stringer et al. |
| 2010/0218253 A1 | 8/2010 | Sutton et al. |
| 2011/0167474 A1 | 7/2011 | Sinha et al. |
| 2011/0219434 A1 | 9/2011 | Betz et al. |
| 2011/0225647 A1 | 9/2011 | Dilley et al. |
| 2012/0240183 A1 | 9/2012 | Sinha |

* cited by examiner

| Mobile Device List | | | | | | | |
|---|---|---|---|---|---|---|---|
| Search | | | | | | | |
| Apply Policy to Selected | | | | | | | |
| User ID | User Name | Device Type | Device ID | Last Sync | Compliant | Group | Department |
| ... | ... | ... | ... | ... | ... | ... | ... |

FIG. 23

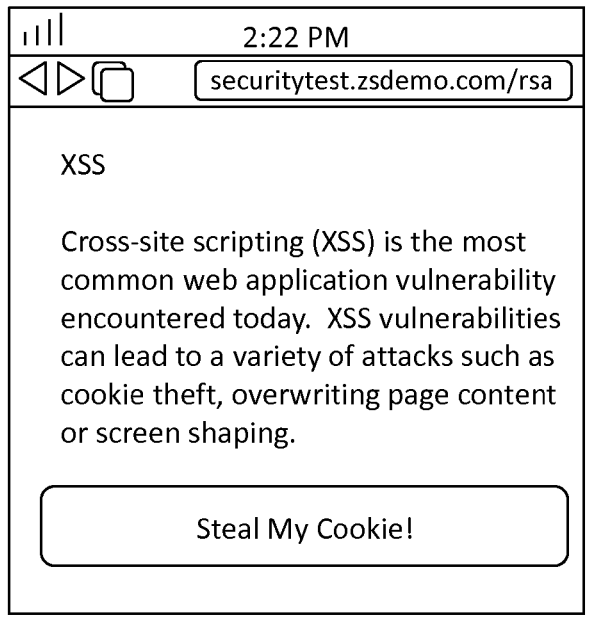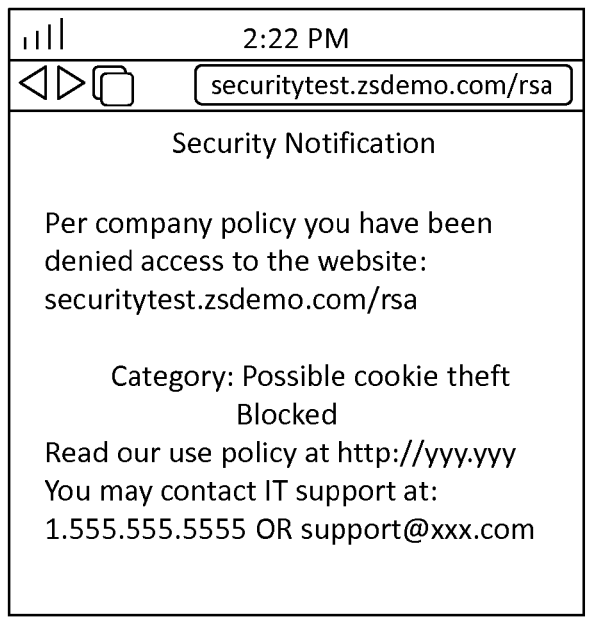
FIG. 25

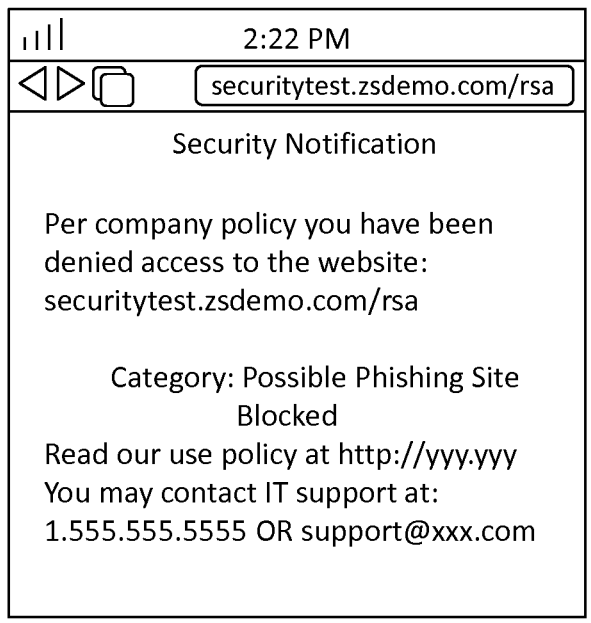
FIG. 26

| | https://admin.zscaler.net/dashboard | |
|---|---|---|
| DASHBOARD SECURE MANAGE COMPLY ANALYZE REPORTING ADMINISTRATION | | |

[Web] [Email]  Transaction Drill Down

| | | | | | |
|---|---|---|---|---|---|
| Action: Blocked | ID | Time | SSL | URL | Policy Action |
| Request: Any Type | | | | | |
| User: All | ... | ... | ... | ... ... ... | ... ... |
| Department: All | | | | | |
| Location: RSA Zscaler | | | | | |
| App Classification: All | | | | | |
| URL Classification: All | | | | | |
| Standard Security: Ignore X | | | | | |
| Adv. Security: Ignore Y | | | | | |
| Client IP: All | | | | | |
| Server IP: All | | | | | |
| Sent/Receive Bytes: All Size | | | | | |
| File Type: All | | | | | |
| DLP Violation: All | | | | | |
| Transaction Type: HTTP/S | | | | | |
| Time Range: 3 hours | | | | | |

FIG. 27

DYNAMIC USER IDENTIFICATION AND POLICY ENFORCEMENT IN CLOUD-BASED SECURE WEB GATEWAYS

CROSS-REFERENCE TO RELATED APPLICATION(S)

This application is a continuation-in-part of the foregoing U.S. patent applications/patents, the contents of each are incorporated in full by reference herein.

| Filing Date | Ser. No. | Title |
| --- | --- | --- |
| Mar. 18, 2011 | 13/051,519 | SYSTEMS AND METHODS FOR MOBILE APPLICATION SECURITY CLASSIFICATION AND ENFORCEMENT |
| Aug. 9, 2011 | 13/206,337 | CLOUD BASED MOBILE DEVICE MANAGEMENT SYSTEMS AND METHODS |
| Sep. 23, 2011 | 13/243,807 | CLOUD BASED MOBILE DEVICE SECURITY AND POLICY ENFORCEMENT |
| Dec. 8, 2011 | 13/315,002 | CLOUD BASED SOCIAL NETWORKING POLICY AND COMPLIANCE SYSTEMS AND METHODS |

FIELD OF THE INVENTION

Generally, the field of art of the present disclosure pertains to computer and network systems and methods, and more particularly, to dynamic user identification and policy enforcement in cloud-based secure web gateways (SWG).

BACKGROUND OF THE INVENTION

A Secure Web Gateway (SWG) provides authenticated Internet access to users of an organization allowing various security and access policies to be enforced based on administrator preferences and policies. Gartner defines a SWG as protecting Web-surfing devices from infection and enforcing company policies. A SWG is a solution that filters unwanted software/malware from user-initiated Web/Internet traffic and enforces corporate and regulatory policy compliance. These gateways must, at a minimum, include Uniform Resource Locator (URL) filtering, malicious-code detection and filtering, and application controls for popular Web-based applications, such as instant messaging (IM) and Skype. Native or integrated data leak prevention is also increasingly included. Since most Internet traffic is typically generated by browsers and uses Hypertext Transfer Protocol (HTTP), a SWG is typically an HTTP proxy using various mechanisms such as cookies or HTTP authentication to authenticate users and associate transactions to them. Over the years, end-to-end encryption using Secure Sockets Layer (SSL) has become common across the Internet. Intermediate proxies have to essentially perform man-in-the-middle attacks to break SSL tunnels before policies can be enforced. The emergence of mobile devices and apps has created newer challenges. In the past, web traffic came predominantly from browsers that behaved in a standards compliant fashion when it came to HTTP protocol. Apps on mobile devices are purpose built to talk to dedicated servers that are maintained by the app owners. While HTTP is the predominant protocol used, apps may use encryption techniques that are not proxy friendly, ignore cookies and HTTP redirection, etc.

BRIEF SUMMARY OF THE INVENTION

In an exemplary embodiment, a cloud-based secure Web gateway includes a network interface communicatively coupled to a network; a processor; and memory storing instructions that, when executed, cause the processor to: dynamically associate traffic received on the network interface with users, wherein the traffic includes a combination of authenticated traffic and unknown traffic; maintain the dynamic association over time; share the dynamic association with at least one additional cloud-based secure Web gateway; apply policies to the traffic based on the dynamic association, wherein the policies include one or more of allowing, blocking, or cautioning the traffic; and log the traffic based on the policies and the dynamic association.

In another exemplary embodiment, a cloud-based secure Web method includes dynamically associating traffic received on a network interface with users, wherein the traffic includes a combination of authenticated traffic and unknown traffic; maintaining the dynamic association over time; sharing the dynamic association with a plurality of cloud-based secure Web gateways which are part of a distributed security system; applying policies to the traffic based on the dynamic association, wherein the policies include one or more of allowing, blocking, or cautioning the traffic; and logging the traffic based on the policies and the dynamic association.

In yet another exemplary embodiment, a network includes a distributed cloud-based security system coupled to the Internet; a plurality of cloud-based secure Web gateways within the distributed cloud-based security system; and a plurality of users accessing the Internet through the distributed cloud-based security system; wherein each of the plurality of cloud-based secure Web gateways is configured to: dynamically associate traffic received on a network interface with individual users of the plurality of users, wherein the traffic includes a combination of authenticated traffic and unknown traffic; maintain the dynamic association over time; share the dynamic association between the plurality of cloud-based secure Web gateways via a central authority; apply policies to the traffic based on the dynamic association, wherein the policies include one or more of allowing, blocking, or cautioning the traffic; and log the traffic based on the policies and the dynamic association.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which:

FIG. 1 is a network diagram of a distributed security system which may be utilized for mobile device security and policy enforcement, cloud based social networking policy and compliance systems and methods, and the like;

FIGS. 17A and 17B are network diagrams of a network of an exemplary implementation with one or more mobile devices communicatively coupled to an external network via a distributed security system, a cloud system, or the like;

FIGS. 23-26 are GUI screen shots of security and policy enforcement in the cloud on a mobile device;

FIG. 27 is a GUI screen shot of a user interface for a network administrator of a cloud based security system;

DETAILED DESCRIPTION OF THE INVENTION

In various exemplary embodiments, secure Web gateway systems and methods are described delivering the SWG as a cloud-based service to organizations and providing dynamic user identification and policy enforcement therein. As a cloud-based service, the SWG systems and methods provide scalability and capability of accommodating multiple organizations therein with proper isolation therebetween. There are two basic requirements for the cloud-based SWG: (i) Having some means of forwarding traffic from the organization or its users to the SWG nodes, and (ii) Being able to authenticate the organization and users for policy enforcement and access logging. The SWG systems and methods dynamically associate traffic to users regardless of the source (device, location, encryption, application type, etc), and once traffic is tagged to a user/organization, various polices can be enforced and audit logs of user access can be maintained.

Figure 1:
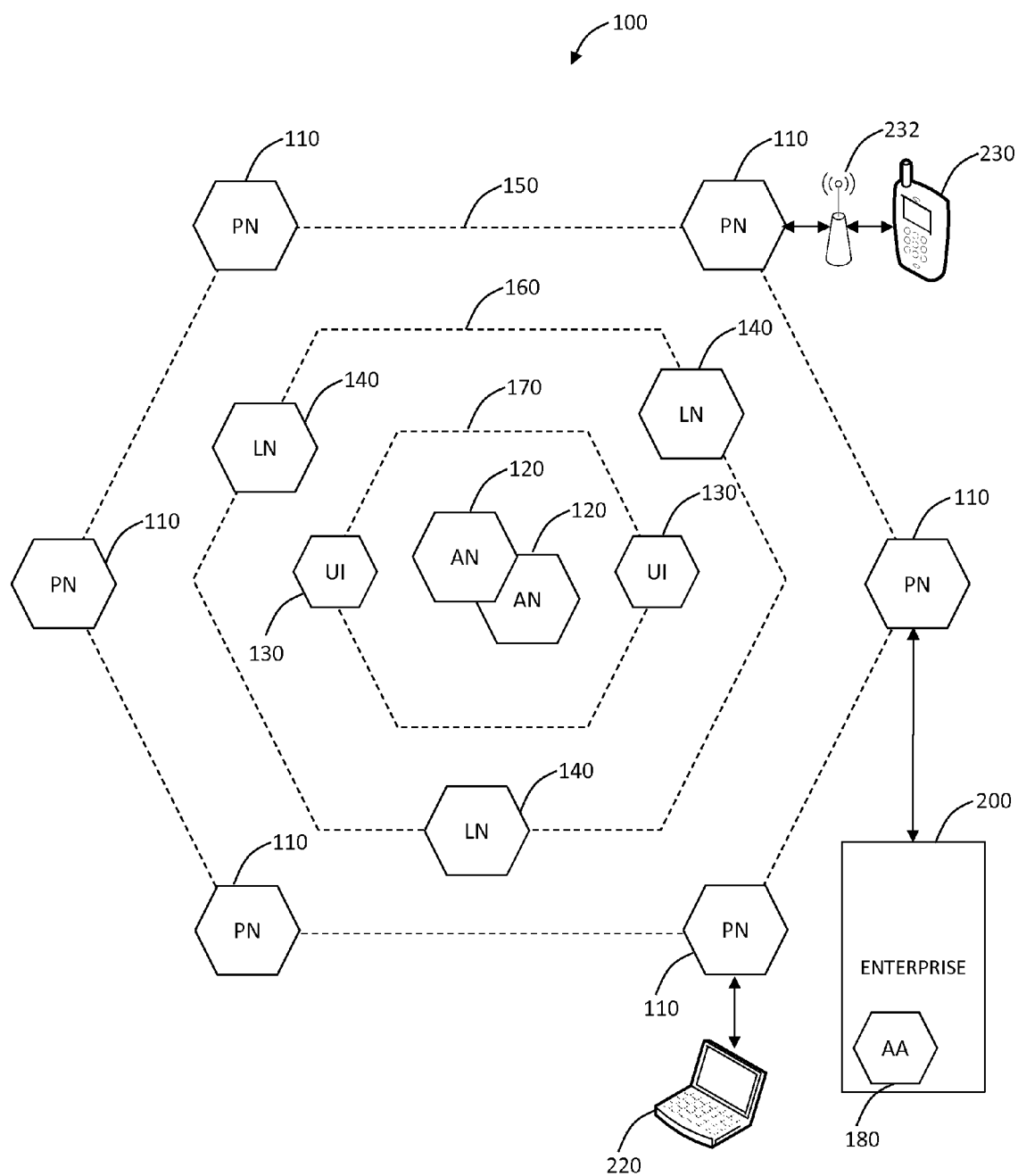

Referring to FIG. 1, in an exemplary embodiment, a block diagram illustrates a distributed security system 100. The system 100 may, for example, be implemented as an overlay network in a wide area network (WAN), such as the Internet, a local area network (LAN), or the like. The system 100 includes content processing nodes, PN 110, that proactively detect and preclude the distribution of security threats, e.g., malware, spyware, viruses, email spam, etc., and other undesirable content sent from or requested by an external system. Example external systems may include an enterprise 200, a computer device 220, and a mobile device 230, or other network and computing systems communicatively coupled to the system 100. In an exemplary embodiment, each of the processing nodes 110 may include a decision system, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an exemplary embodiment, the threat classification may be reduced to a subset of categories e.g., violating, non-violating, neutral, unknown. Based on the subset classification, the processing node 110 may allow distribution of the content item, preclude distribution of the content item, allow distribution of the content item after a cleaning process, or perform threat detection on the content item. In an exemplary embodiment, the actions taken by one of the processing nodes 110 may be determinative on the threat classification of the content item and on a security policy of the external system to which the content item is being sent from or from which the content item is being requested by. A content item is violating if, for any part C=[c1, c2, . . . , cm] of the content item, at any of the processing nodes 110, any one of the data inspection engines generates an output that results in a classification of "violating."

Figure 3:
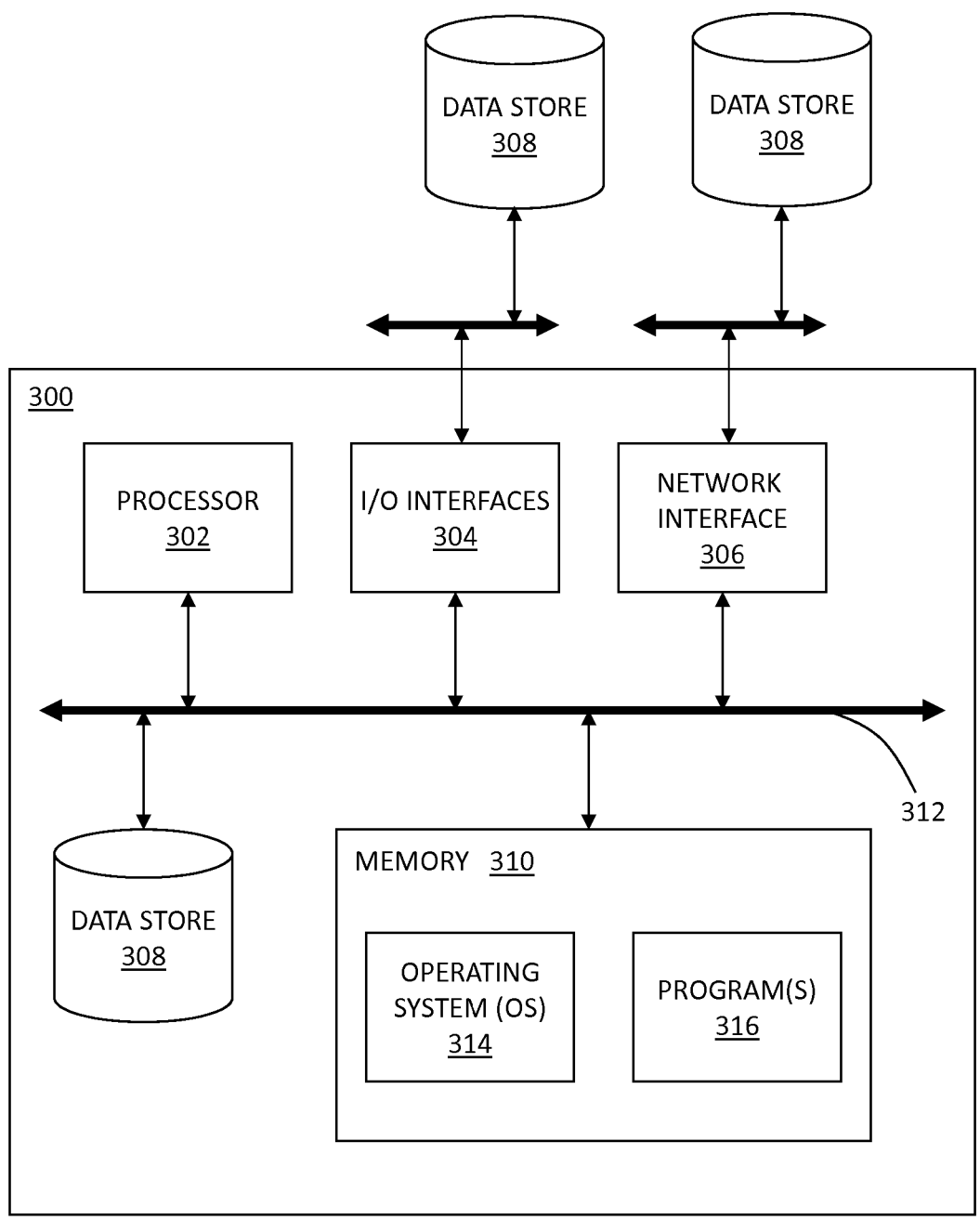
FIG. 3 is a block diagram of a server which may be used in the distributed security system of FIG. 1 or standalone.

Each of the processing nodes 110 may be implemented by one or more of computer and communication devices, e.g., server computers, gateways, switches, etc, such as the server 300 described in FIG. 3. In an exemplary embodiment, the processing nodes 110 may serve as an access layer 150. The access layer 150 may, for example, provide external system access to the security system 100. In an exemplary embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc may be configured to establish communications through the nearest (in traffic communication time, for example) processing node 110. A mobile device 230 may be configured to communicated to a nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an exemplary embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, web sites and/or content that is disallowed, restricted domains, etc. The authority nodes 120 may distribute the policy data to the access nodes 110. In an exemplary embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may implemented by push and pull distribution schemes described in more detail below. In an exemplary embodiment, each of the authority nodes 120 may be implemented by one or more computer and communication devices, e.g., server computers, gateways, switches, etc., such as the server 300 described in FIG. 3. In some exemplary embodiments, the authority nodes 120 may serve as an application layer 160. The application layer 160 may, for example, manage and provide policy data, threat data, and data inspection engines and dictionaries for the processing nodes 110.

Other application layer functions may also be provided in the application layer 170, such as a user interface (UI) front-end 130. The user interface front-end 130 may provide a user interface through which users of the external systems may provide and define security policies, e.g., whether email traffic is to be monitored, whether certain web sites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 160. Each of the logging nodes 140 may store data related to security operations and network traffic processed by the processing nodes 110 for each external system. In an exemplary embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used.

In an exemplary embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180.

In an exemplary embodiment, the processing node 110 may act as a forward proxy that receives user requests to external servers addressed directly to the processing node 110. In another exemplary embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an exemplary embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols may be used. In another exemplary embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise the access agent 180 may be configured to perform MPLS labeling. In another transparent proxy mode exemplary embodiment, a protected system, such as the enterprise 200, may identify the processing node 110 as a next hop router for communication with the external servers.

Generally, the distributed security system 100 may generally refer to an exemplary cloud-based security system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one exemplary embodiment of a cloud-based system, and those of ordinary skill in the art will recognize the cloud based mobile device security and policy systems and methods contemplate operation on any cloud based system.

Figure 2:
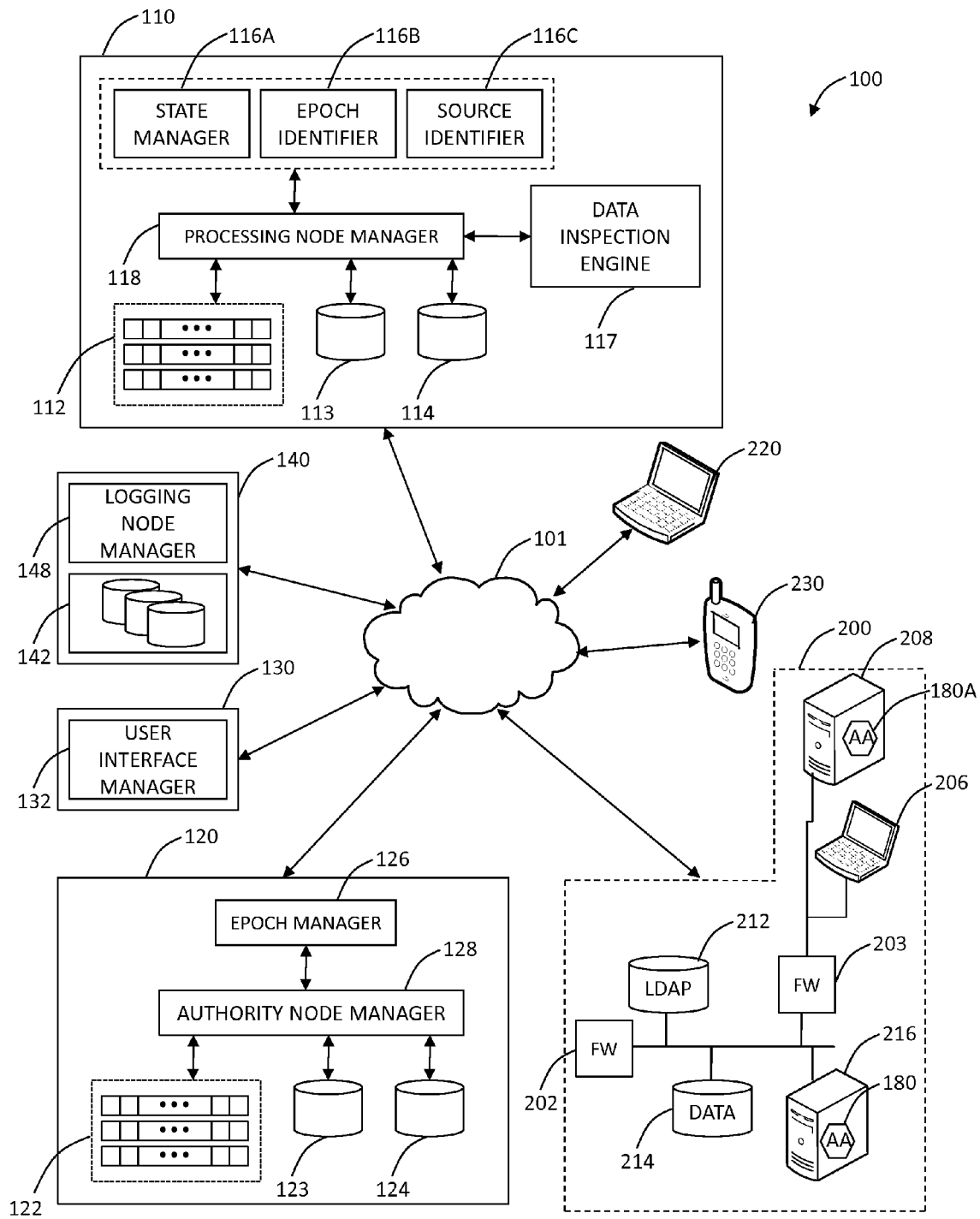
FIG. 2 is a network diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 therebetween. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight directory access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include a user identifiers, login passwords, and a login history associated with each user identifier. The other data stores 214 may include sensitive information, such as bank records, medical records, trade secret information, or any other information warranting protection by one or more security measures.

In an exemplary embodiment, a client access agent 180a may be included on a client computer 208. The client access agent 180a may, for example, facilitate security processing by providing a hash index of files on the user computer 208 to a processing node 110 for malware, virus detection, etc. Other security operations may also be facilitated by the access agent 180a. In another exemplary embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the server 206 of the enterprise 200, or to some other secured data provider server. The computer device 220 and the mobile device 230 can also store information warranting security measures, such as personal bank records, medical information, and login information, e.g., login information to a server 216 of the enterprise 200, or to some other secured data provider server.

In an exemplary embodiment, the processing nodes 110 are external to network edges of the external systems 200, 220 and 230. Each of the processing nodes 110 stores security policies 113 received from the authority node 120 and monitors content items requested by or sent from the external systems 200, 220 and 230. In an exemplary embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to further validate the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 may be distributed to the processing nodes 110, which then store a local copy of the detection processing filter 112.

In an exemplary embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an exemplary embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another exemplary embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 110.

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 112 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, may update the master threat data 124 and the master detection process filter 122 stored in the authority node data store according to the threat data update received from the processing node 110. In an exemplary embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated with the present invention. The data inspection engines 116, processing node manager 118, authority node manager 128, user interface manager 132, logging node manager 148, and authority agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

Referring to FIG. 3, in an exemplary embodiment, a block diagram illustrates a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or a similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Figure 4:
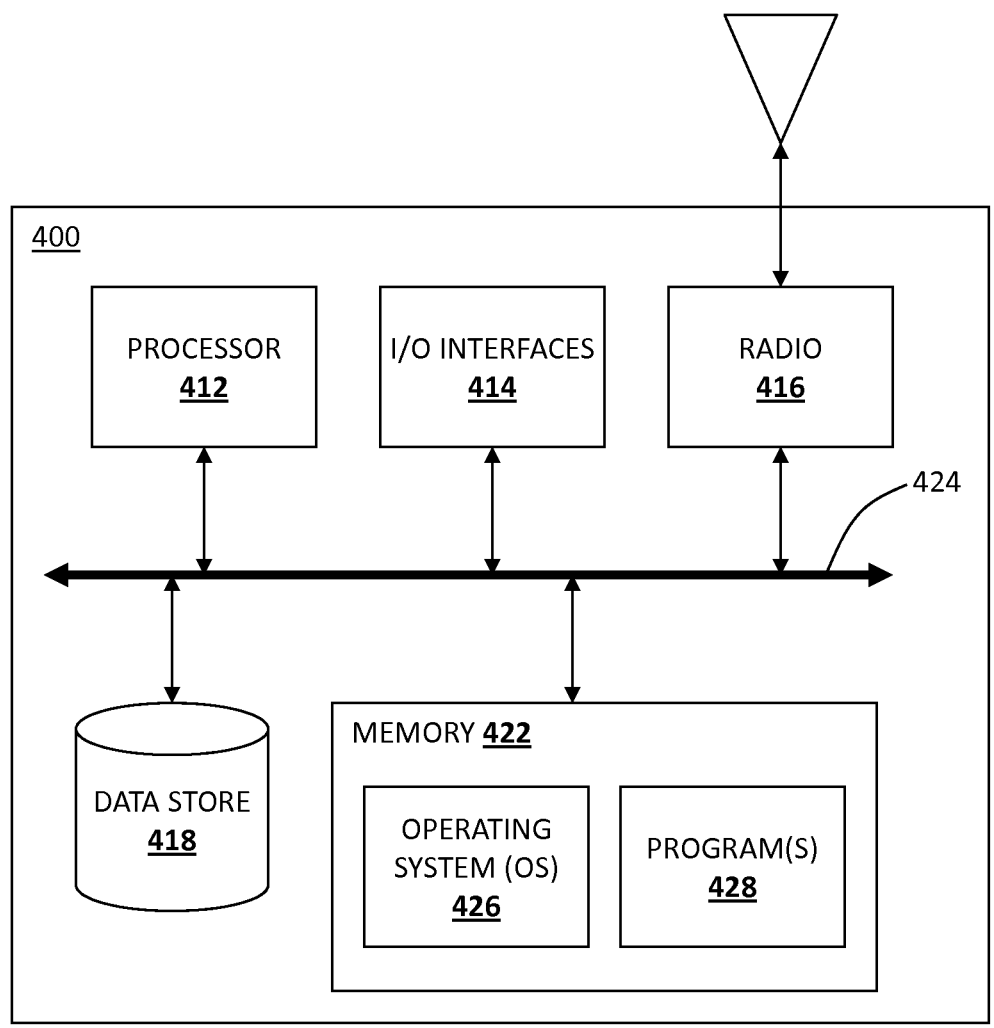
FIG. 4 is a block diagram of a mobile device which may be used in the system of FIG. 1 or with any other cloud-based system.

Referring to FIG. 4, in an exemplary embodiment, a block diagram illustrates a mobile device 400, which may be used in the system 100 or the like. The mobile device 400 can be a digital device that, in terms of hardware architecture, generally includes a processor 412, input/output (I/O) interfaces 414, a radio 416, a data store 418, and memory 422. It should be appreciated by those of ordinary skill in the art that FIG. 4 depicts the mobile device 410 in an oversimplified manner, and a practical embodiment may include additional components and suitably configured processing logic to support known or conventional operating features that are not described in detail herein. The components (412, 414, 416, 418, and 422) are communicatively coupled via a local interface 424. The local interface 424 can be, for example but not limited to, one or more buses or other wired or wireless connections, as is known in the art. The local interface 424 can have additional elements, which are omitted for simplicity, such as controllers, buffers (caches), drivers, repeaters, and receivers, among many others, to enable communications. Further, the local interface 424 may include address, control, and/or data connections to enable appropriate communications among the aforementioned components.

The processor 412 is a hardware device for executing software instructions. The processor 412 can be any custom made or commercially available processor, a central processing unit (CPU), an auxiliary processor among several processors associated with the mobile device 410, a semiconductor-based microprocessor (in the form of a microchip or chip set), or generally any device for executing software instructions. When the mobile device 410 is in operation, the processor 412 is configured to execute software stored within the memory 422, to communicate data to and from the memory 422, and to generally control operations of the mobile device 410 pursuant to the software instructions. In an exemplary embodiment, the processor 412 may include a mobile optimized processor such as optimized for power consumption and mobile applications. The I/O interfaces 414 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 414 can also include, for example, a serial port, a parallel port, a small computer system interface (SCSI), an infrared (IR) interface, a radio frequency (RF) interface, a universal serial bus (USB) interface, and the like. The I/O interfaces 414 can include a graphical user interface (GUI) that enables a user to interact with the mobile device 410. Additionally, the I/O interfaces 414 may further include an imaging device, i.e. camera, video camera, etc.

The radio 416 enables wireless communication to an external access device or network. Any number of suitable wireless data communication protocols, techniques, or methodologies can be supported by the radio 416, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 418 may be used to store data. The data store 418 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 418 may incorporate electronic, magnetic, optical, and/or other types of storage media.

The memory 422 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 422 may incorporate electronic, magnetic, optical, and/or other types of storage media. Note that the memory 422 may have a distributed architecture, where various components are situated remotely from one another, but can be accessed by the processor 412. The software in memory 422 can include one or more software programs, each of which includes an ordered listing of executable instructions for implementing logical functions. In the example of FIG. 4, the software in the memory system 422 includes a suitable operating system (O/S) 426 and programs 428. The operating system 426 essentially controls the execution of other computer programs, and provides scheduling, input-output control, file and data management, memory management, and communication control and related services. The programs 428 may include various applications, add-ons, etc. configured to provide end user functionality with the mobile device 400. For example, exemplary programs 428 may include, but not limited to, a web browser, social networking applications, streaming media applications, games, mapping and location applications, electronic mail applications, financial applications, and the like. In a typical example, the end user typically uses one or more of the programs 428 along with a network such as the system 100.

Figure 5:
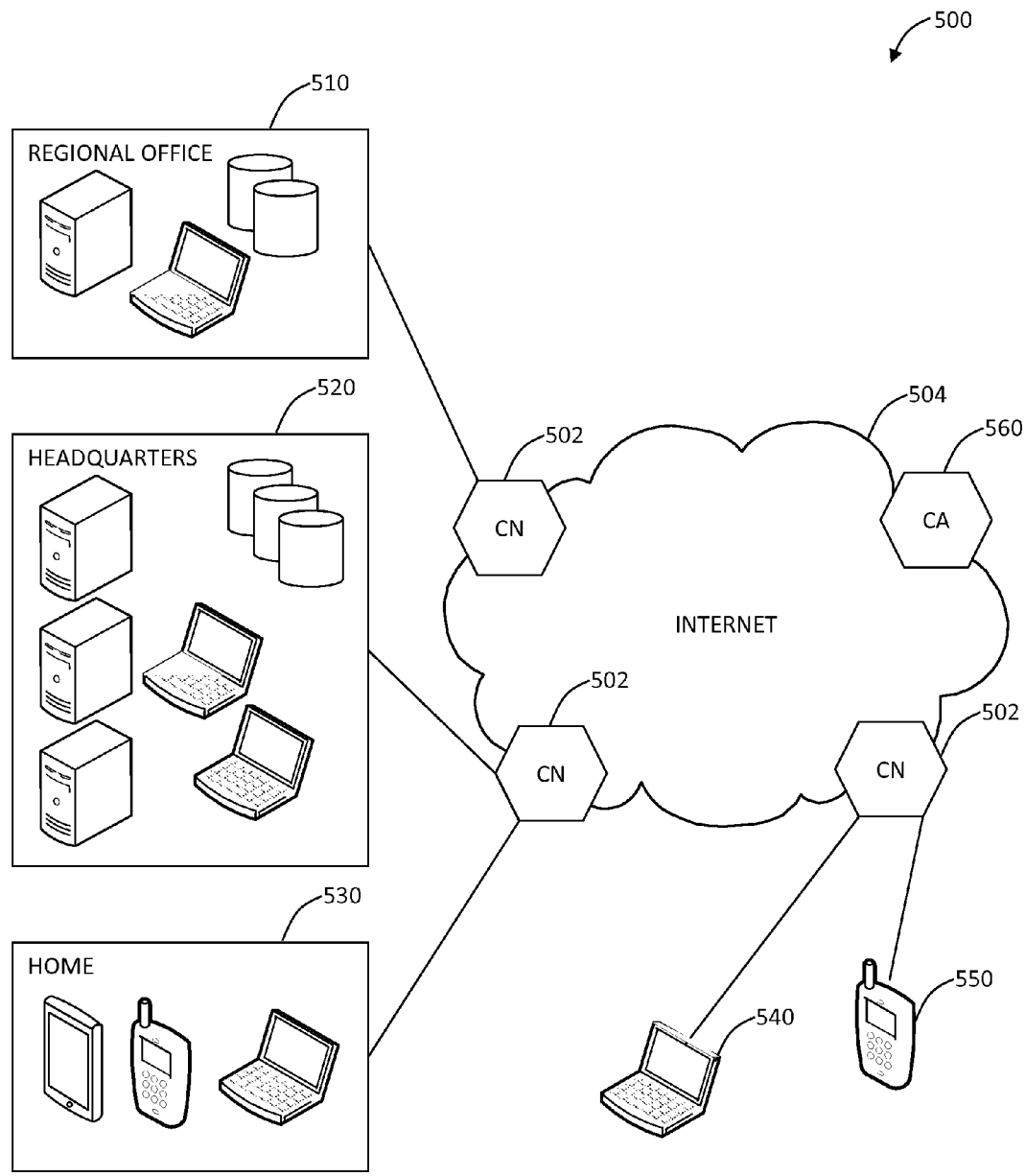
FIG. 5 is a network diagram of a cloud system for implementing cloud based mobile device management (MDM), mobile device security and policy enforcement, and cloud based social networking policy and compliance systems and methods.

Referring to FIG. 5, in an exemplary embodiment, a cloud system 500 is illustrated for implementing the SWG systems and methods and the like. The cloud system 500 includes one or more cloud nodes (CN) 502 communicatively coupled to the Internet 504. The cloud nodes 502 may include the processing nodes 110, the server 300, or the like. That is, the cloud system 500 may include the distributed security system 100 or another implementation of a cloud based system. In the cloud system 500, traffic from various locations (and various devices located therein) such as a regional office 510, headquarters 520, various employee's homes 530, mobile laptop 540, and mobile device 550 is redirected to the cloud through the cloud nodes 502. That is, each of the locations 510, 520, 530, 540, 550 is communicatively coupled to the Internet 504 through the cloud nodes 502. The cloud system 500 may be configured to perform various functions such as spam filtering, uniform resource locator (URL) filtering, antivirus protection, bandwidth control, data loss prevention, zero day vulnerability protection, web 2.0 features, and the like. In an exemplary embodiment, the cloud system 500 and the distributed security system 100 may be viewed as Security-as-a-Service through the cloud.

In various exemplary embodiments, the cloud system 500 can be configured to provide mobile device security and policy systems and methods. The mobile device 550 may be the mobile device 400, and may include common devices such as smartphones, tablets, netbooks, personal digital assistants, MP3 players, cell phones, e-book readers, and the like. The cloud system 500 is configured to provide security and policy enforcement for devices including the mobile devices 550 in the cloud. Advantageously, the cloud system 500 avoids platform specific security apps on the mobile devices 550, forwards web traffic through the cloud system 500, enables network administrators to define policies in the cloud, and enforces/cleans traffic in the cloud prior to delivery to the mobile devices 550. Further, through the cloud system 500, network administrators may define user centric policies tied to users, not devices, with the policies being applied regardless of the device used by the user. The cloud system 500 provides 24×7 security with no need for updates as the cloud system 500 is always up-to-date with current threats and without requiring device signature updates. Also, the cloud system 500 enables multiple enforcement points, centralized provisioning and logging, automatic traffic routing to a nearest cloud node 502, geographical distribution of the cloud nodes 502, policy shadowing of users which is dynamically available at the cloud nodes, etc.

In other exemplary embodiments, the cloud system 500 can be configured to provide MDM functionality for mobile devices such as the mobile device 550. The cloud based MDM systems and methods provide an ability to manage the mobile device 550 and other mobile devices with or without an MDM client on the mobile device 550 and without an appliance or server at the enterprise (i.e. at the regional office 510 or the headquarters 520). In an exemplary embodiment, a client-less implementation leverages the ActiveSync protocol, proxied through the distributed cloud nodes 502 to enforce basic policies e.g. password, screen lock, remote wipe, enable/disable features such as the browser or camera, etc. In another exemplary embodiment, a client based implementation uses a platform specific application and associated API to connect with the mobile device 550 and provide MDM features. The cloud system 500 provides scalability, redundancy, and reduced latency with the multiple geographically distributed cloud nodes 502. MDM policies may be defined in a Central Authority (CA) 560 that pushes then out, on-demand, to geographically distributed cloud nodes 502. The mobile devices 550 communicate with local cloud nodes 502 without requiring configuration changes, e.g. the mobile devices 550 may be automatically directed to the closest cloud node 502. Policies are automatically available at the local cloud node 502 minimizing latency. In the event of cloud node 502 failure or excessive load, connections are load balanced automatically across other cloud nodes 502, transparent to the mobile device 550.

ActiveSync is a mobile data synchronization technology and protocol developed by Microsoft. ActiveSync works over hypertext transfer protocol (HTTP) and HTTPS and is licensed by several mobile device manufacturers such as Apple, Google, etc. ActiveSync email client is pre-installed on most mobile devices 550 today. ActiveSync allows email and policy sync. Generally, there are two implementations of ActiveSync. A first implementation synchronizes data and information with mobile devices 550 and a specific computer. A second implementation commonly known as Exchange ActiveSync (EAS) provides push synchronization of contacts, calendars, tasks, email, and the like between servers and the mobile devices 550. Exchange ActiveSync runs over HTTP(S) using Wireless Application Protocol (WAP) binary Extensible markup language (XML). WAP binary XML is a binary format that encodes the parsed physical form of an XML document, i.e., the structure and content of the document entities. Meta-information, including the document type definition and conditional sections, is removed when the document is converted to the binary format. This provides a compact binary representation optimized for wireless applications.

In exemplary embodiments, the cloud nodes 502 may be configured to intercept or spoof Exchange ActiveSync messages. In an exemplary embodiment, if a mobile device 550 has an ActiveSync association, such as with a server at the headquarters 520, the cloud node 502 can proxy this connection blocking it if non-compliant and optionally insert policy provisioning commands. In another exemplary embodiment, if the mobile device 550 does not have an Exchange ActiveSync association, the cloud node 502 can be configured to emulate or spoof an Exchange ActiveSync server and issue policy provisioning commands to the mobile device 550. In yet another exemplary embodiment, the mobile device 550 may be provisioned with a platform specific MDM API which interfaces to the cloud node 502. The cloud based MDM systems and methods are described herein with exemplary embodiments referencing Exchange ActiveSync for illustration, and those of ordinary skill in the art will recognize this may include any synchronization techniques between the mobile device 550 and the cloud nodes 502 including WAP binary XML and the like. Fundamentally, the cloud based MDM systems and methods seek to utilize one or more existing synchronization techniques with the cloud system 500 for providing MDM functionality.

In another exemplary embodiment, the cloud system 500 can be configured to provide cloud based social networking policy and compliance systems and methods. That is, the cloud system 500 may be utilized to give enterprises full control and visibility into what their employees and/or guests are seeing and posting to various sites. In an exemplary embodiment, the cloud system 500 may includes an in-line Web 2.0 policy enforcement system (depicted in FIG. 28) which pervasively monitors all Web 2.0 traffic and enforces policy thereon. In another exemplary embodiment, the cloud system 500 may include an administrator approval function (depicted in FIG. 29) to enable administrator review of some or all content being provided to Web 2.0 sites. In yet another exemplary embodiment, the cloud system 500 may include a Web 2.0 site specific agent (depicted in FIG. 30) pushed to an end user's device for local activity monitoring and feature control. Note, the foregoing contemplate operation on the cloud system 500, the distributed security system 100, and any other cloud based system implementation.

Figure 6:
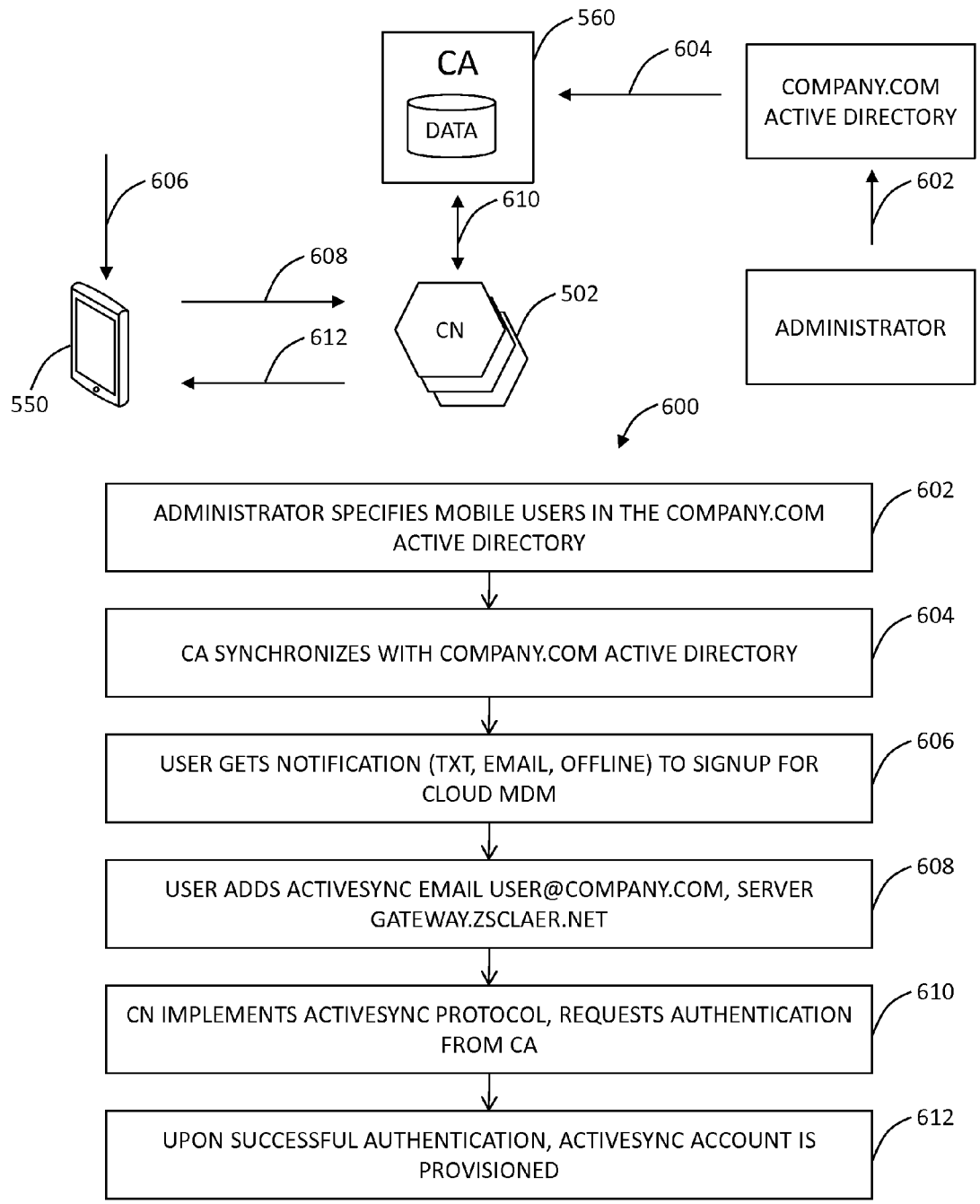
FIG. 6 is a flowchart and a network diagram of an Exchange ActiveSync provisioning method for the cloud system of FIG. 5 or the distributed security system of FIG. 1.

Referring to FIG. 6, in an exemplary embodiment, a flowchart and a network diagram illustrate an Exchange ActiveSync provisioning method 600 for the cloud system 500. In particular, the provisioning method 600 assumes the mobile device 550 does not have an Exchange ActiveSync association, and the cloud node 502 is configured to emulate or spoof an Exchange ActiveSync server and issue policy provisioning commands. For the provisioning method 600, an administrator specifies mobile users and their associated mobile devices 550 in a company's active directory (step 602). Active Directory (AD) is a service created by Microsoft that uses standardized protocols to provide a variety of network services, including Lightweight Directory Access Protocol (LDAP), Kerberos-based authentication, Domain Name System (DNS)-based naming and other network information, and the like. Features of the active directory include a centralized location for network administration and security, information security and single sign-on for user access to networked resources, scalability, standardized access to application data, and the like. The CA 560 synchronizes with the company's active directory (step 604). Specifically, the CA 560 obtains user credentials for associated mobile devices 550 in a company's active directory. Each of the mobile users receives a notification to sign up for the cloud MDM (step 606). This may include a plurality of methods for the notification including an email, a text message, offline instructions, and the like.

Through the sign up, the user adds ActiveSync email, e.g. user@company.com and a server, e.g. gateway.zscaler.net (step 608). Here, the user's mobile device 550 is configured to set up an Exchange ActiveSync connection with the server gateway.zscaler.net, i.e. the cloud node 502. DNS resolution for gateway.zscaler.net is done by the cloud service such that the resolved IP address points the mobile device to the nearest cloud node 502. Once connected, the cloud node 502 is configured to implement the ActiveSync protocol with the mobile device 550 and the cloud node 502 requests authentication from the CA 560 (step 610). Here, the CA 560 provides the cloud node 502 with the applicable authentication data as well as configuration data for MDM. Finally, upon successful authentication, an ActiveSync account is provisioned between the mobile device 550 and the cloud node 502 (step 612). The cloud node 502 utilizes this ActiveSync account to provide MDM of the mobile device 550.

Figure 7:
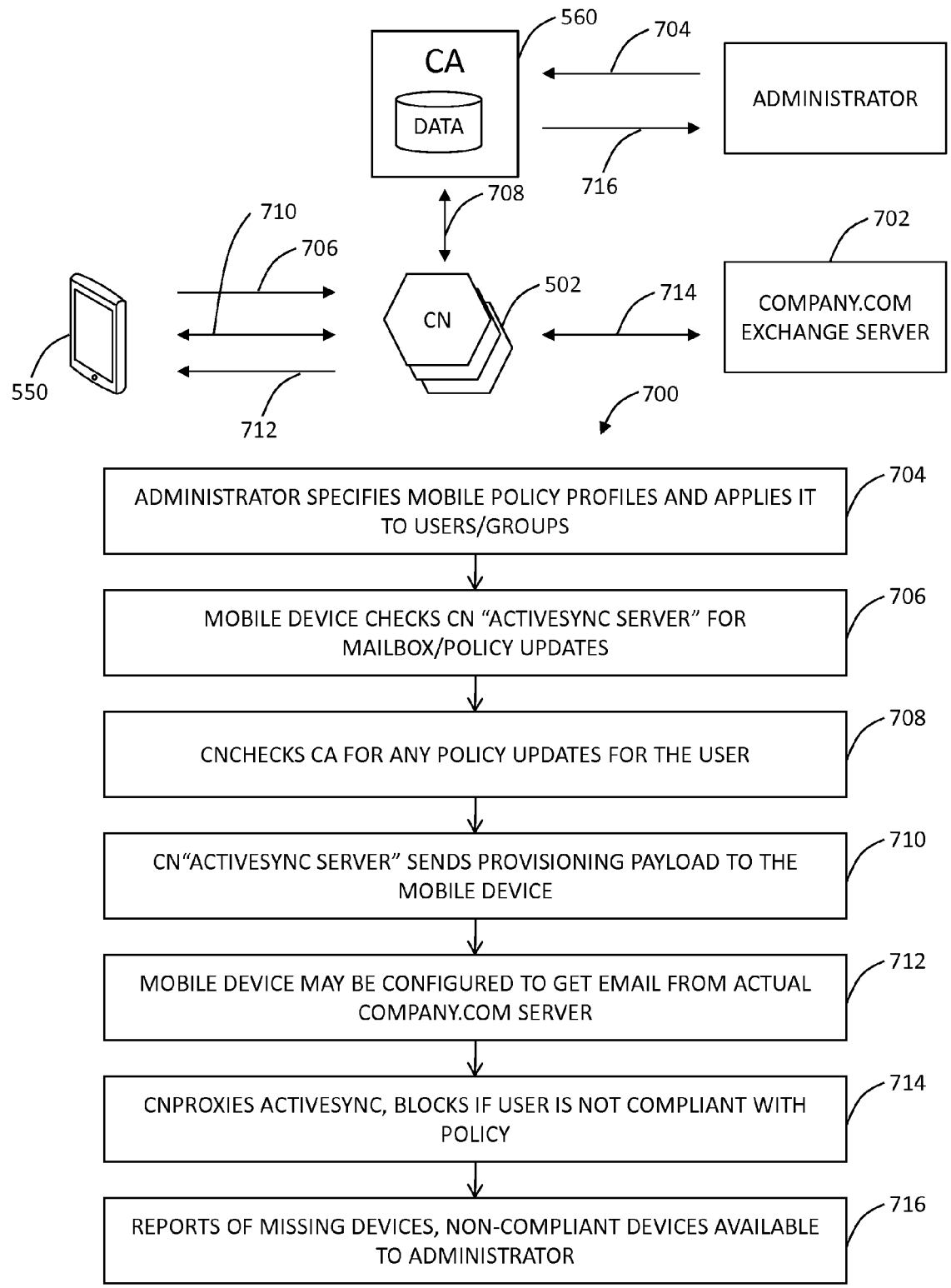
FIG. 7 is a flowchart and a network diagram of another Exchange ActiveSync provisioning method for the cloud system of FIG. 5 or the distributed security system of FIG. 1.

Referring to FIG. 7, in an exemplary embodiment, a flowchart and a network diagram illustrate Exchange ActiveSync based MDM method 700 for the cloud system 500. For the MDM method 700, an administrator specifies mobile policy profiles and applies it to users/groups of mobile devices 550 (step 704). In the provisioning method 700, the mobile device 550 is already set up with an ActiveSync account on the Exchange server 702. The mobile device 550 checks the cloud node 502 "ActiveSync Server" for mailbox/policy updates (step 706). In an exemplary embodiment, the cloud node 502 may be configured to operate as an "ActiveSync Server" to the mobile device 550. In another exemplary embodiment, the cloud node 502 may be configured to monitor and update ActiveSync messages between the mobile device 550 and the Exchange server 702 and issue policy provisioning commands therein. In either embodiment, the mobile device 550 is communicatively coupled to the Exchange server 702 through the cloud node 502. The cloud node 502 may check the CA 560 for any policy updates for the user (step 708). Specifically, the administrator may define the policy for the user through the CA 560. The cloud node "ActiveSync Server" sends provisioning payload information to the mobile device 550 (step 710).

Additionally, the mobile device 550 may be configured to get email from the actual company.com Exchange server 702 (step 712). Specifically, the mobile device 550 may have an ActiveSync association with the cloud node 502 and another with the Exchange server 702. If the ActiveSync association is with the Exchange server 702, the cloud node 502 may be configured to monitor for ActiveSync messages for compliance with policy and to add information for provisioning, etc. In either embodiment, the cloud node 502 may be configured to proxy ActiveSync messages between the mobile device 550 and the Exchange server 702 (step 714). If the ActiveSync messages do not comply with defined policy, the cloud node 502 may be configured to block email traffic from the Exchange server 702 to the mobile device 550. Finally, the administrator has access to various information related to MDM such as reports of missing devices, reports of non-compliant devices, etc. (step 716). In particular, the cloud node 502 is configured to proxy ActiveSync messages from the Exchange server 702. In an exemplary embodiment without the Exchange server 702, the cloud node 502 is configured to spoof policy messages of the ActiveSync protocol. With the Exchange server 702, then cloud node 502 is proxying the traffic and in the process can insert MDM policy messages in the stream.

Using Exchange ActiveSync with the cloud node 502 and the mobile device 550, the provisioning method 600 and the MDM method 700 may utilize built-in support for ActiveSync among many existing mobile devices 550. For example, mobile devices 550 with built-in or native operating system support for Exchange ActiveSync include Apple iPhone, iPad, Android devices, Palm OS, Symbian devices, Microsoft platforms, and the like. Using ActiveSync, the cloud based MDM systems and methods can perform various functions, policies, etc. including, for example, remote wipe of the mobile device 550, password enforcement on the mobile device 550, locking the mobile device 550 based on inactivity, a refresh interval for policy updates, requiring manual synchronization such as while roaming, preventing use of the camera, etc. For example, related to the password enforcement, the cloud based MDM systems and methods can enforce a minimum password length, set a number of failed password attempts before locking the mobile device 550 or performing a local wipe, require a mixture of characters in the password, set a password expiration period and keep a password history to prevent new passwords from matching previous passwords, and the like.

The cloud based MDM systems and methods can implement various additional functions, features, policies, etc. such as instantaneous policy changes, scheduled policy changes, device backup, device settings, and the like. Further, the cloud based MDM systems and methods can allow/disallow various functions of the mobile device 550 including, for example, installation of specified applications, use of specified applications, prevention of screen capture, prevention of voice dialing, prevention of games, prevention of social media, prevention of streaming media, web browser usage, prevention of Wi-Fi and/or Bluetooth, and the like. Also, the cloud based MDM systems and methods may further provide provisioning of various functions and features on the mobile device 550 including, for example, Wi-Fi settings, virtual private network (VPN) settings, email settings, provisioning of credentials and the like, MDM settings, wireless (e.g., GSM/CDMA, 4G) settings, and the like.

Figure 8:
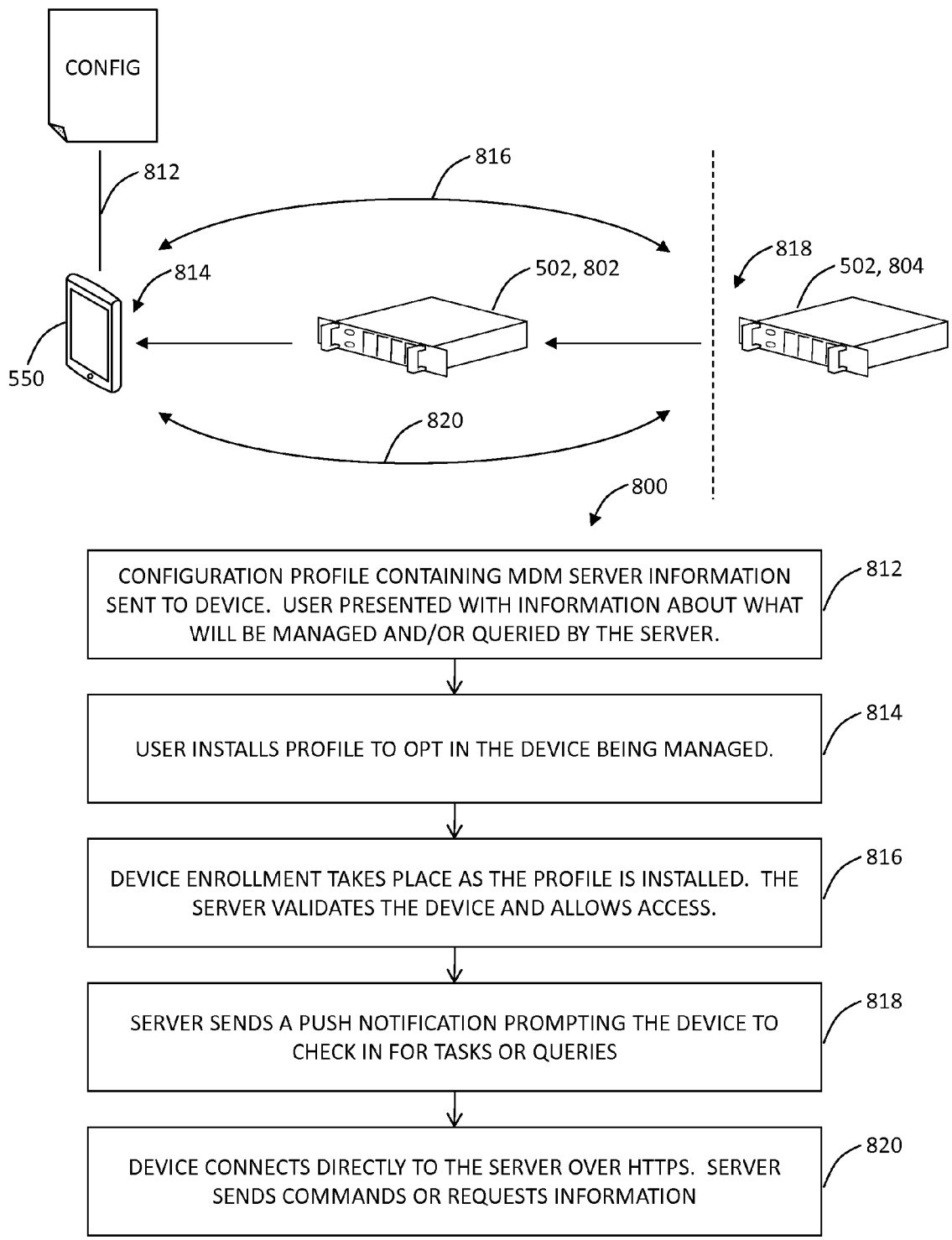
FIG. 8 is a flowchart and a network diagram illustrate a platform specific MDM configuration for the cloud system of FIG. 5 or the distributed security system of FIG. 1.

Referring to FIG. 8, in an exemplary embodiment, a flowchart and a network diagram illustrate a platform specific MDM configuration 800 for the cloud system 500. In an exemplary embodiment, the platform specific MDM configuration 800 operates with a push notification server 802 and a third party MDM server 804 each in communication with the mobile device 550. In another exemplary embodiment, the platform specific MDM configuration 800 may include the cloud node 502 performing the functions of both the push notification server 802 and the platform specific MDM server 804. The platform specific MDM configuration 800 begins with a configuration profile containing MDM server information being sent to the mobile device 550 (step 812). The user of the mobile device 550 may be presented with information about what will be managed and/or queried by the server. The configuration profile may be sent or provided to the mobile device 550 is a variety of methods, e.g. email, text message, web browser link, physical loading via a connection to the mobile device 550, and the like. Also, the configuration profile may include software configured to operate on the mobile device 550 to coordinate and provide the MDM functionality.

The user (or an IT administrator) installs the profile to opt the mobile device 550 in to being managed by the MDM server 804 or the cloud node 502. The mobile device 550 is enrolled as the profile is being installed (step 816). The server 804/cloud node 502 validates the mobile device 550 and allows access. The push notification server 802 sends a push notification prompting the mobile device 550 to check in for tasks, queries, etc. (step 818). Finally, the mobile device 550 connects directly to the MDM server 804 or the cloud node 502, such as over HTTPS (step 820). The MDM server 804 or the cloud node 502 is configured to operate with the installed profile on the mobile device 550. Specifically, the MDM server 804 or the cloud node 502 may send commands to or request information from the mobile device 550. The exemplary commands may include the various functions described herein with reference to the provisioning methods 600, 700 or any other MDM related functions. The platform specific MDM configuration 800 is described herein using the push notification server 802 and the MDM server 802 or the cloud node 502. Generally, the platform specific MDM configuration 800 uses other MDM platform specific clients that need to be installed on the mobile device and use various APIs to get configuration updates and report status to the MDM server 804 or the cloud node 502.

Referring to FIGS. 9-14, in various exemplary embodiments, graphical user interfaces (GUI) illustrate screen shots of an MDM provisioning platform. As described herein, the cloud system 500 or the distributed security system 100 may provide a cloud based MDM system and method. Since the cloud nodes 502 and/or the processing nodes 110 act as proxies for the mobile device 550, they can log all traffic and concurrently provide MDM functionality. Each of the cloud system 500 or the distributed security system 100 has a management system. For example, the distributed security system 100 has the user interface front-end 130. The cloud system 500 may have a similar function. Specifically, the management system provides an administrator with a consolidated view for managing and provisioning the cloud system 500 and the distributed security system 100. In an exemplary embodiment, the cloud based MDM system and method may include an integrated dashboard such as through the management system, the user interface front-end 130, a web server associated with the cloud nodes 502, and the like. This integrated dashboard may be utilized by the administrator to define configurations, policy, security, provisioning, etc. of the mobile devices 550. Furthermore the integrated dashboard may provide transaction logs, alerts, reports, etc. related to MDM of the mobile devices 550.

Figures 9, 10:
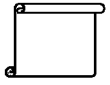
FIGS. 9-14 are graphical user interfaces (GUI) illustrate screen shots of an MDM provisioning platform associated with the cloud system of FIG. 5 or the distributed security system of FIG. 1.
Figure 11:
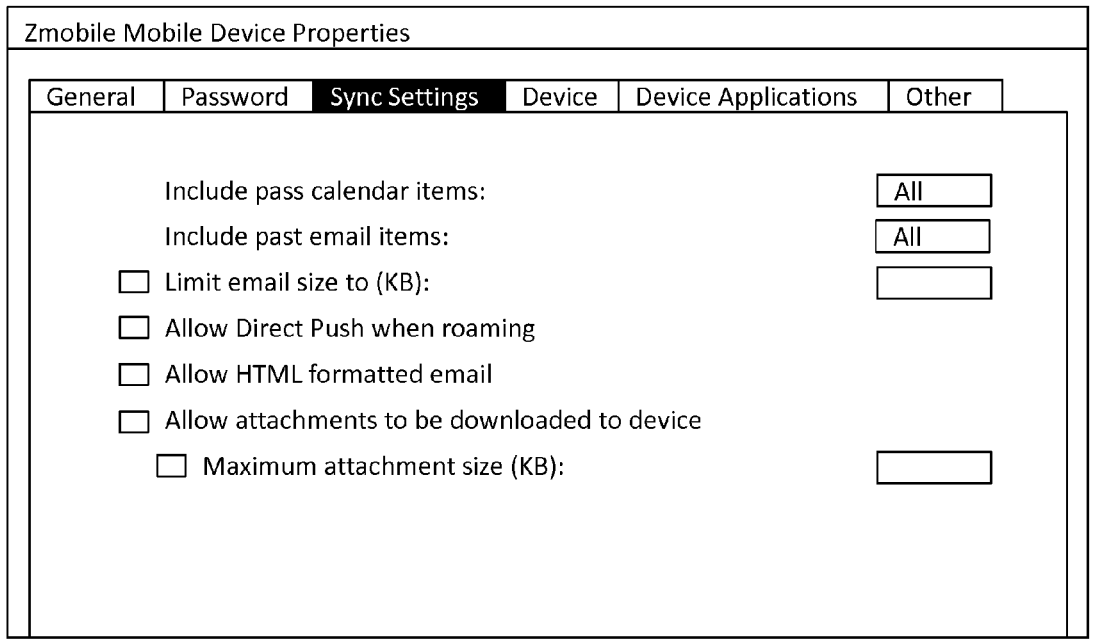
Figure 12:
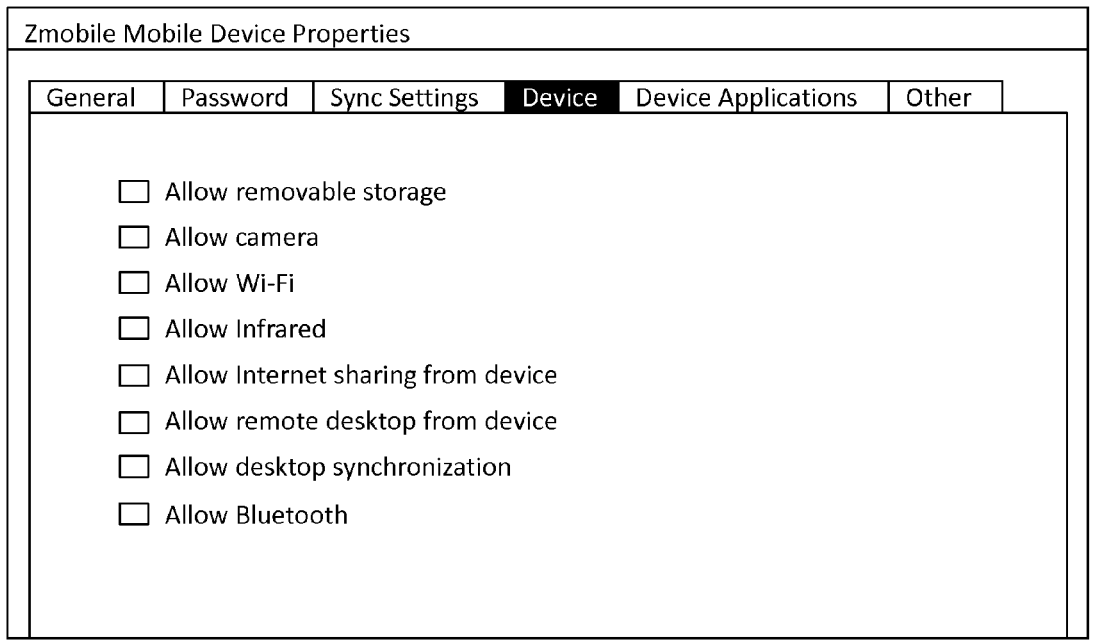
Figure 13:
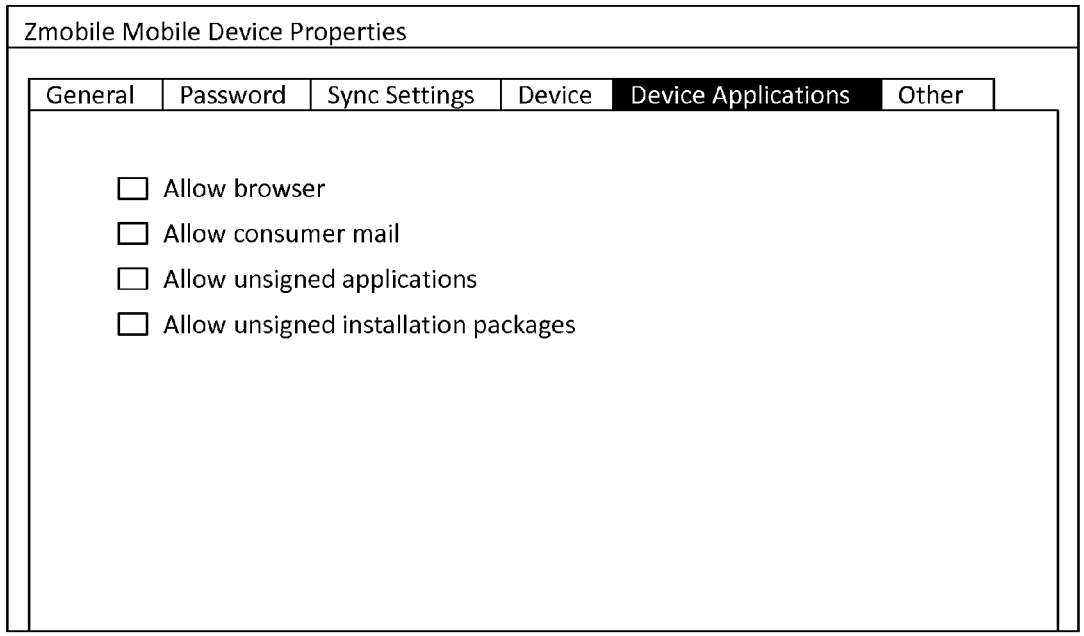
Figure 14:
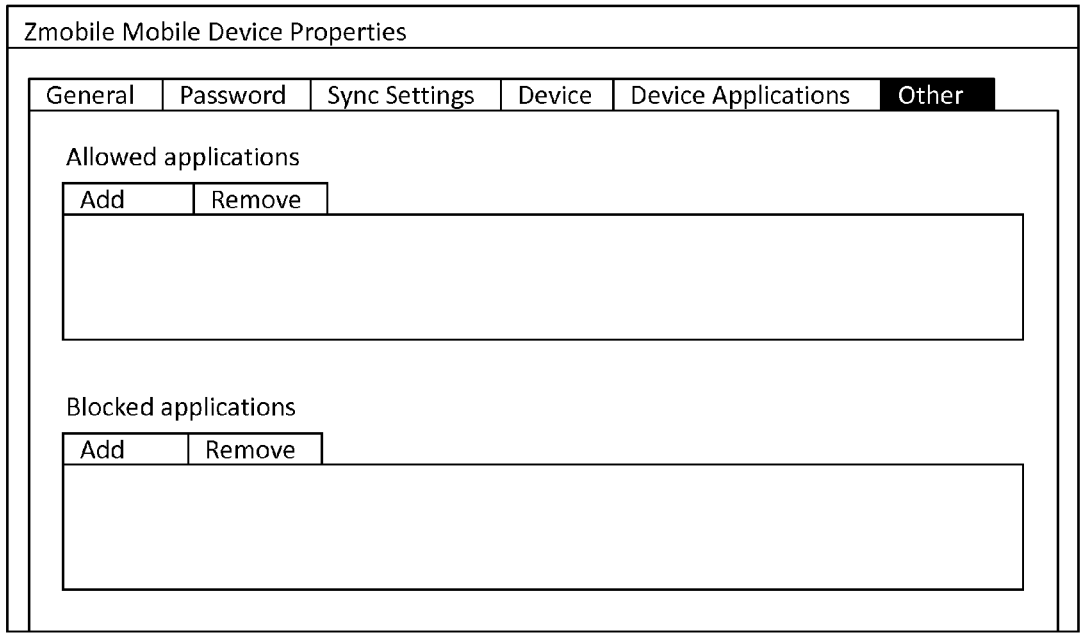

FIGS. 9-14 illustrate exemplary screen shots of the integrated dashboard. FIG. 9 is a GUI representing general settings, such as device name, a setting for allowing non-provisionable devices, and a setting for refresh interval. For example, the GUIs are examples using Microsoft Exchange ActiveSync. The refresh interval is a setting to determine how often the mobile device 550 communicates with the MDM server 804 or the cloud node 502 to receive updates. FIG. 10 is a GUI representing password related settings for the mobile device 550. Here, the administrator can make various settings as described herein related to the password of the mobile device 550. FIG. 11 is a GUI representing synchronization settings. Here, the administrator can make various settings for synchronizing the mobile device 550 to an Exchange server or some other mail server. FIG. 12 is a GUI representing device settings. Here, the administrator can define policy related to the mobile device 550 usage of various items, e.g. camera, etc. FIG. 13 is a GUI representing device application settings. Here, the administrator can define usage policy related to the mobile device 550. Finally, FIG. 14 is a GUI representing other settings. In an exemplary embodiment, the other settings may include a list of allowed applications/blocked applications. The administrator may prohibit or allow use of specifically enumerated applications.

Figures 15, 16:
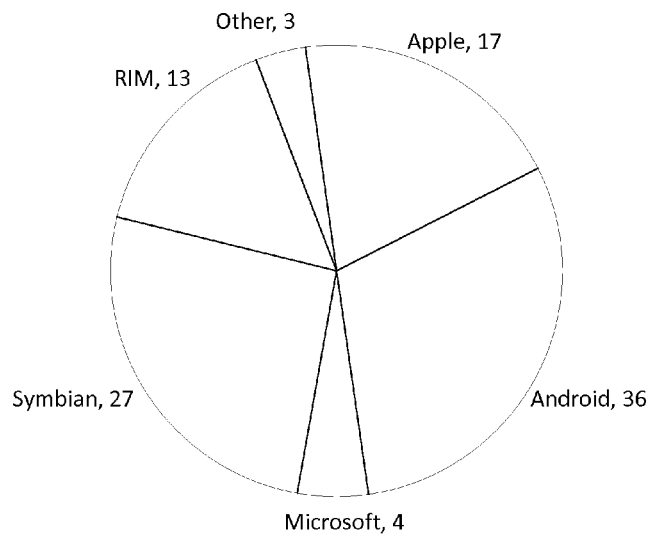
FIGS. 15 and 16 are GUIs of screen shots of reporting and graphing associated with the cloud based MDM system and method.

Referring to FIGS. 15 and 16, in various exemplary embodiments, GUIs illustrate screen shots of reporting and graphing associated with the cloud based MDM system and method. FIG. 15 illustrates an exemplary list of mobile device 550 under management of the cloud based MDM system and method. This list may include various attributes, user ID, user name, device type, etc., and may be sorted by any column. The list may allow sort, search, and ability to apply predefined policy profiles to selected users. Further, an administrator may click on a particular user to drill down into more details. The list may provide a convenient method of applying policy to multiple mobile devices 550 simultaneously. Further, the cloud based MDM system and method contemplate location based policies—even on Apple devices. Here, the mobile devices 550 may be set for different policies based on which cloud node 502 they are connected through. This may be provisioned through the list or through another GUI. FIG. 16 illustrates a graph associated with the cloud based MDM system and method. That is, the integrated dashboard may include a reporting tab which provides the administrator with an ability to do reporting, tracking, etc. In FIG. 16, a pie chart illustrates a division of types of mobile devices 550 associated with the cloud based MDM system and method. The cloud based MDM system and method can provide numerous reports, such as number of devices by platform that have checked in over a period of time, number of missing devices by platform that have not checked in, etc. Further, the cloud based MDM system and method contemplates an ability to drill down to gather further details on devices, history, etc.

As described herein, the cloud based MDM system and method contemplate MDM management through the cloud thereby reducing or eliminating the need for external equipment, software, etc. to provide MDM. With the cloud, policies may be dynamic, adaptable based on individual user behavior, aggregate user behavior, user location, etc. Specifically, the cloud enables IT administrators to see a global view. For example, if a new mobile application is introduced that has perilous effect on the enterprise, the administrator can block this mobile application across all mobile devices 550 in a single step. The cloud based MDM further provides flexibility to IT administrators allowing prevention of data leakage across mobile devices, and the like. The cloud can protect different mobile devices across different networks in a single integrated fashion. The cloud is pervasive and up-to-date with respect to security threats. The cloud by nature is distributed enabling access across the enterprise, i.e. HQ as well as road warrior employees. The cloud provides a quick rollout, low maintenance, and low cost of ownership for the enterprise. Finally, the cloud is inherently resilient and scalable.

Figure 17A:
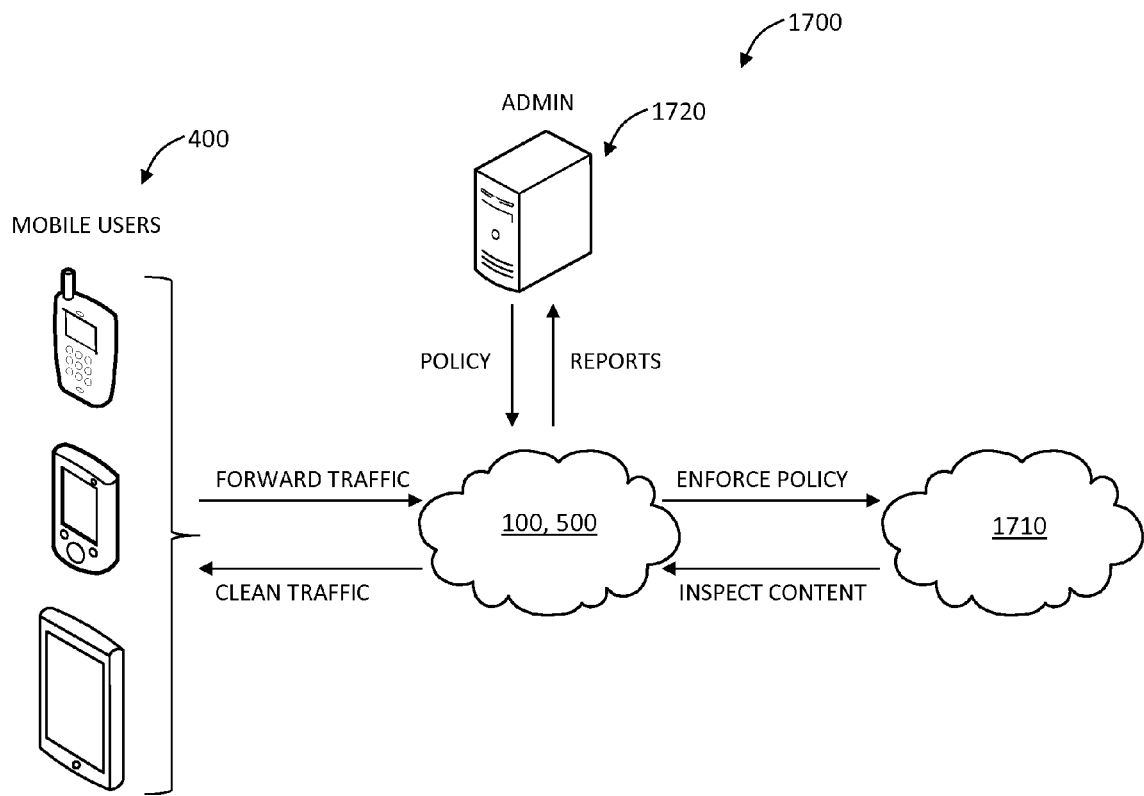
Figure 17B:
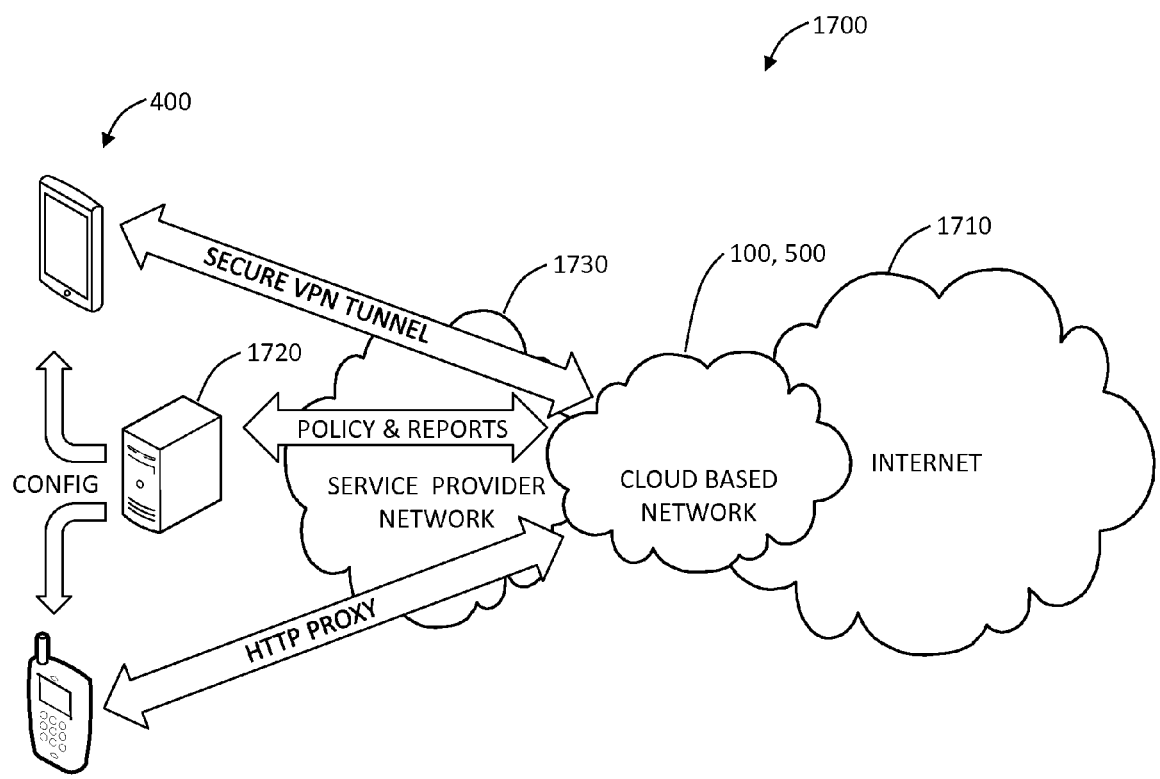

Referring to FIGS. 17A and 17B, in an exemplary embodiment, a network 1700 illustrates an exemplary implementation of the present invention with one or more mobile devices 400 communicatively coupled to an external network 1710 (e.g., the Internet) via the distributed security system 100, the cloud system 500, or the like. In particular, the mobile devices 400 may include any of the aforementioned mobile devices 400 described herein. The distributed security system 100, the cloud system 500, or any other cloud-based system is configured to provide real-time, continuous inspection of mobile data transactions while not impacting performance. Further, the distributed security system 100, the cloud system 500, etc. advantageously is platform-independent allowing the mobile devices 400 to be any type of device, platform, operating system, etc. while providing a consistent level of protection. In an exemplary embodiment, the mobile devices 400 are communicatively coupled to the distributed security system 100, such as, for example, via the processing nodes 110 or to the cloud system 500 via the cloud nodes 502. Note, the mobile devices 400 may access the distributed security system 100, the cloud system 500, etc. via a service provider's wireless network, via a Wi-Fi hotspot, via a wired connection, etc. Each of the mobile devices 400 may include an application, configuration settings, operating system settings, and combinations thereof that configured the mobile device 400 to communicate through to the distributed security system 100, the cloud system 500, etc.

In FIG. 17A, the distributed security system 100, the cloud system 500, etc. is configured to act as a gatekeeper with respect to traffic forwarded from the mobile device 400 to the network 1710 and for traffic forward from the network 1710 to the mobile device 400. In particular, the system 100, 500 is configured to enforce policy guidelines with respect to traffic from the mobile device 400 to the network 910. As described herein, policy refers to a set of use guidelines associated with the mobile device 400. Exemplary policies may include, but not limited to, data usage, time-of-day, location (work vs. off-site), using social networking sites, operating a particular application, black list of web sites, and the like. The system 100, 500 may enforce policy in a variety of ways including blocking non-compliant traffic and displaying a notification on the mobile device 400, alerting an administrator 1720, and the like. For example, the administrator 1720 of the system 100, 500 may interact with the system 100, 500 to define policy guidelines as well as to receive reports from the system 100, 500 associated with the mobile devices 400. Concurrent with the policy enforcement, the system 100, 500 may also inspect content from the network 1710 for malicious content (e.g., malware, spyware, viruses, email spam, etc.) and blocking such content from the mobile device 400.

Thus, the implementation of the network 1700 provides a cloud-based security system to the mobile devices 400 that is user, location, and platform independent. There is no requirement for external software on the mobile device 400 other than configuration settings that instruct the mobile device 400 to communicate data through the system 100, 500. In an exemplary embodiment, the mobile device 400 is configured to solely communicate data traffic through the system 100, 500 while voice traffic is handled directly with an end service provider. The network 1700 offers a seamless solution that works independent of platform, requires no updates on the mobile device, filtering and policy enforcement is performed in the cloud, etc. In another exemplary embodiment, the network 1700 may provide IT administrators an ability to monitor and prevent specific applications on the mobile devices 400. This may prevent unacceptable or risky applications.

The network 1700 enforces policy in the cloud, not on the mobile device 400. This means all network content is scanned, both browser and application generated web traffic, to ensure that malicious content is blocked in the cloud—long before it reaches the mobile device 400, or the corporate network. Unlike other mobile security solutions that require platform-specific applications to be installed on every device, the present invention works seamlessly across mobile platforms, including iPhones, iPads, and Android devices, for example. Advantageously, the present invention requires no signature updates on the mobile device 400 and provides real-time inspection in the cloud for every web or data transaction, regardless of whether it came from a browser or from an application installed on the device. Further, the present invention runs in the cloud and has no impact on the mobile device's performance, battery life, or processing resources. Also, the system 100, 500 may provide real-time logs and reports for any user, from any location, on any device, at any time.

FIG. 17B illustrates a network diagram of the network 1700 showing the mobile devices 400 connected to the system 100, 500 via a service provider network 1730. The system 100, 500 is an intermediary between the mobile devices 400 and the network 1710, e.g. the Internet. The service provider network 1730 may include any network by which the mobile devices 400 obtain connectivity including, for example, a wireless carrier (3G, 4G, LTE, WIMAX, etc.), a wireless hotspot (IEEE 802.11), an ad hoc connection, a wired connection, etc. In an exemplary embodiment, the mobile devices 400 may connect over the service provider network 1730 using a secure VPN tunnel to the system 100, 500. In another exemplary embodiment, the mobile devices 400 may connect over the service provider network 1730 using a HyperText Transfer Protocol (HTTP) proxy. The network administrator 1720 is connected to the system 100, 500 via the service provider network 1730, via the network 1710, directly, and the like.

Figure 18:
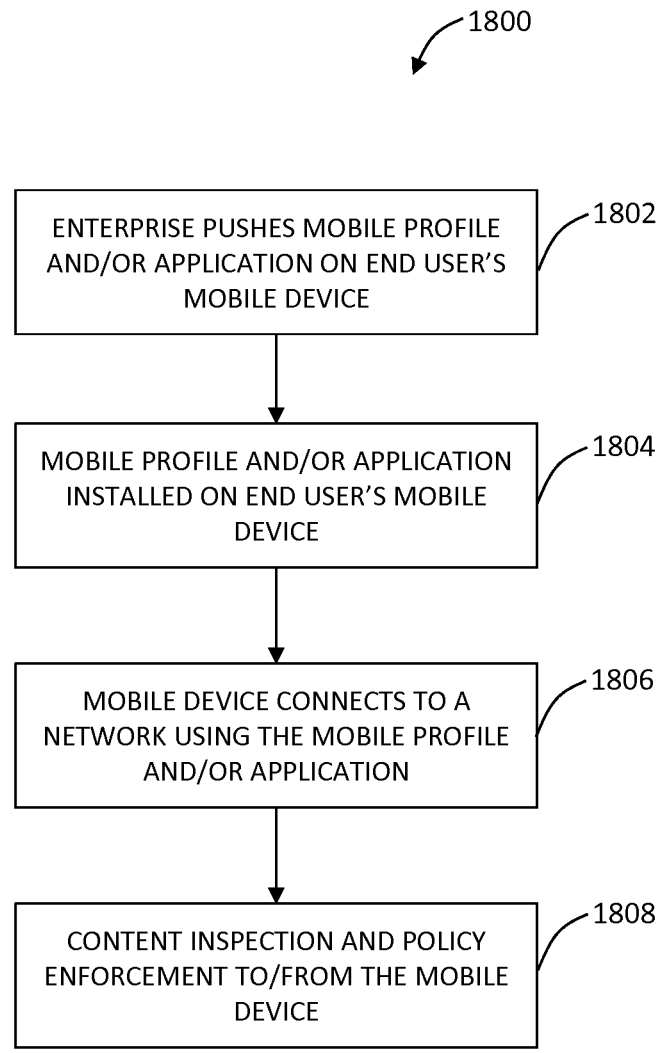
FIG. 18 is a flowchart of a mobile device use method for using a cloud-based security system with a mobile device.

Referring to FIG. 18, in an exemplary embodiment, a flow chart illustrates a mobile device use method 1800 for using a cloud-based security system with a mobile device. The method 1800 may, for example, be implemented in the network 900 such as through the mobile device 400 and the system 100, 500 (or alternatively any cloud-based system). The steps shown in FIG. 18 are each processes that can be executed independently and concurrently as appropriate. First, an enterprise or the like pushes a mobile profile and/or application on an end user's mobile device (step 1802). In an exemplary embodiment, the push includes pushing configuration settings on the mobile device such that data traffic flows through the cloud-based security system. This may include an HTTP Proxy, a VPN between the mobile device and the cloud-based system, from devices in a carrier or service provider's network to the cloud-based system, from a Wi-Fi network to the cloud-based system, etc. For example, a specific operating system associated with the mobile device 400 may natively support such configurations. Alternatively, an application may be pushed on to the mobile device 400 to provide such a connection to the cloud-based security system. The mobile profile and/or the application is installed on the end user's mobile device (step 1804). Once installed, the mobile device is configured to connect to a network using the mobile profile and/or the application (step 1806). Here, the mobile device is configured such that data communication (e.g., web, email, etc.) is through the cloud-based security system. The cloud-based security system is configured to provide content inspection and policy enforcement (step 1808).

Figure 19:
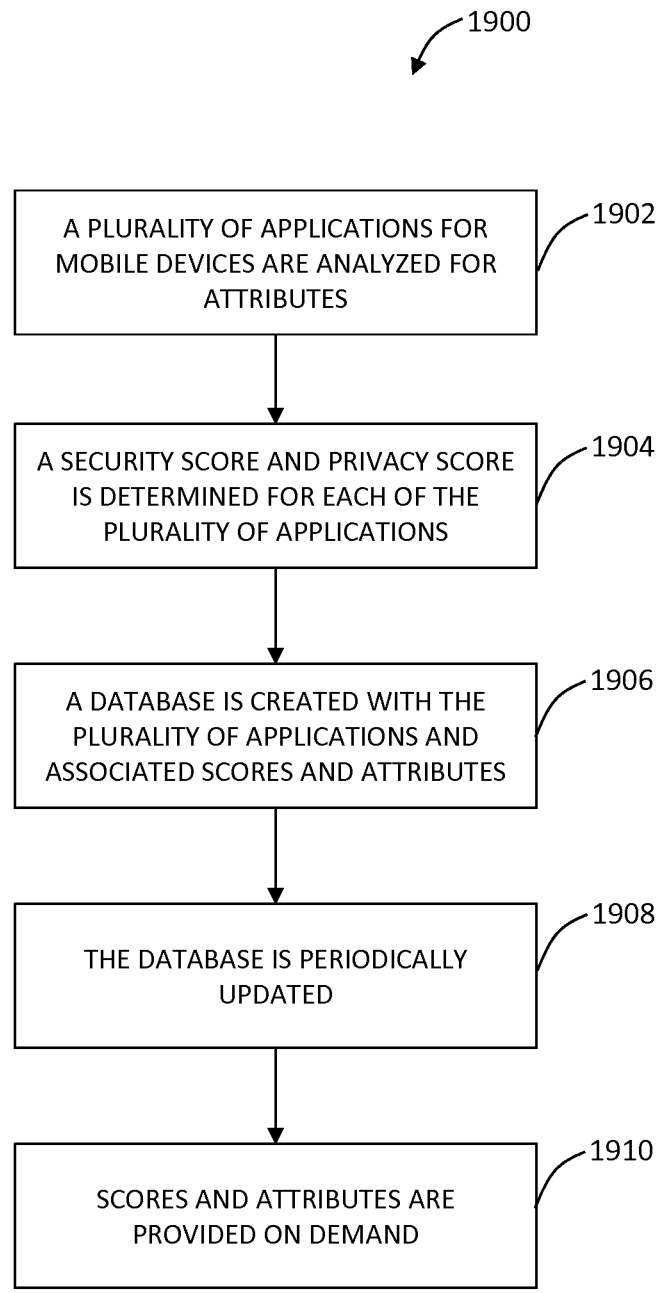
FIG. 19 is a flowchart of a mobile application classification method for classifying applications associated with mobile devices.

Referring to FIG. 19, in an exemplary embodiment, a flow chart illustrates a mobile application classification method 1900 for classifying applications associated with mobile devices. The method 1900 may, for example, be implemented in the network 1700 such as through the mobile device 400 and the system 100, 500 (or alternatively any cloud-based system) or on a device, such as the server 300 communicatively coupled to the network 1700. The steps shown in FIG. 19 are each processes that can be executed independently and concurrently as appropriate. The method 1900 may be utilized for classifying applications based on their security and privacy profile and leveraging the associated data to provide protection and policy enforcement for applications by leveraging the cloud. First, a plurality of applications for mobile devices is analyzed for various attributes (step 1902). The applications may include mobile applications on Apple's App Store, Google's Android Market, and the like. Exemplary attributes may include application creator, category, user-agent strings used by the application to communicate over the network, security attributes, privacy attributes, and the like. The purpose of the method 1900 is to classify each application with an associated score defining risk. For example, in one exemplary embodiment, the method 1900 may determine a security score and a privacy score for each of the plurality of applications (step 1904). These scores may take any form (numerical, alphabetical, etc.). For example, the scores may be based on a numerical range, e.g. 1-10 where 1 is very secure and 10 is very insecure. These scores may define a mobile Application Security Rating (ASR).

In an exemplary embodiment, the security score may be computed based on 1) a security analysis done for the application, 2) application permissions which determine what the application is capable of accessing, 3) reputation of the vendor that created the application, 4) feedback from users, 5) real-time analysis of app behavior in the cloud, and 6) combinations thereof. In an exemplary embodiment, the privacy score may be based on 1) a privacy analysis done for the application, 2) feedback from users of the application around security, 3) real-time analysis of app behavior in the cloud, and 4) combinations thereof. With this data, a database may be created with the plurality of applications and their associated scores and attributes (step 1906). For example, the database may be at a server 300 in the cloud-based system, such as at a processing node 110, at an authority node 120, the cloud node 502, or combinations thereof. This database may be continually or periodically updated (step 1908). For example, the database may be updated as new applications emerge, as new ratings are determined based on the cloud-based system, etc. Further, the method 1900 is configured to provide the scores and the attributes on demand as required by the cloud-based system (step 1910). For example, the cloud-based system may utilize this data in a policy enforcement step, i.e. is a particular application requested by a mobile device allowed per policy, does it meet a minimum threshold for security and/or privacy, will this application interfere with an enterprise network, etc.

Figure 20:
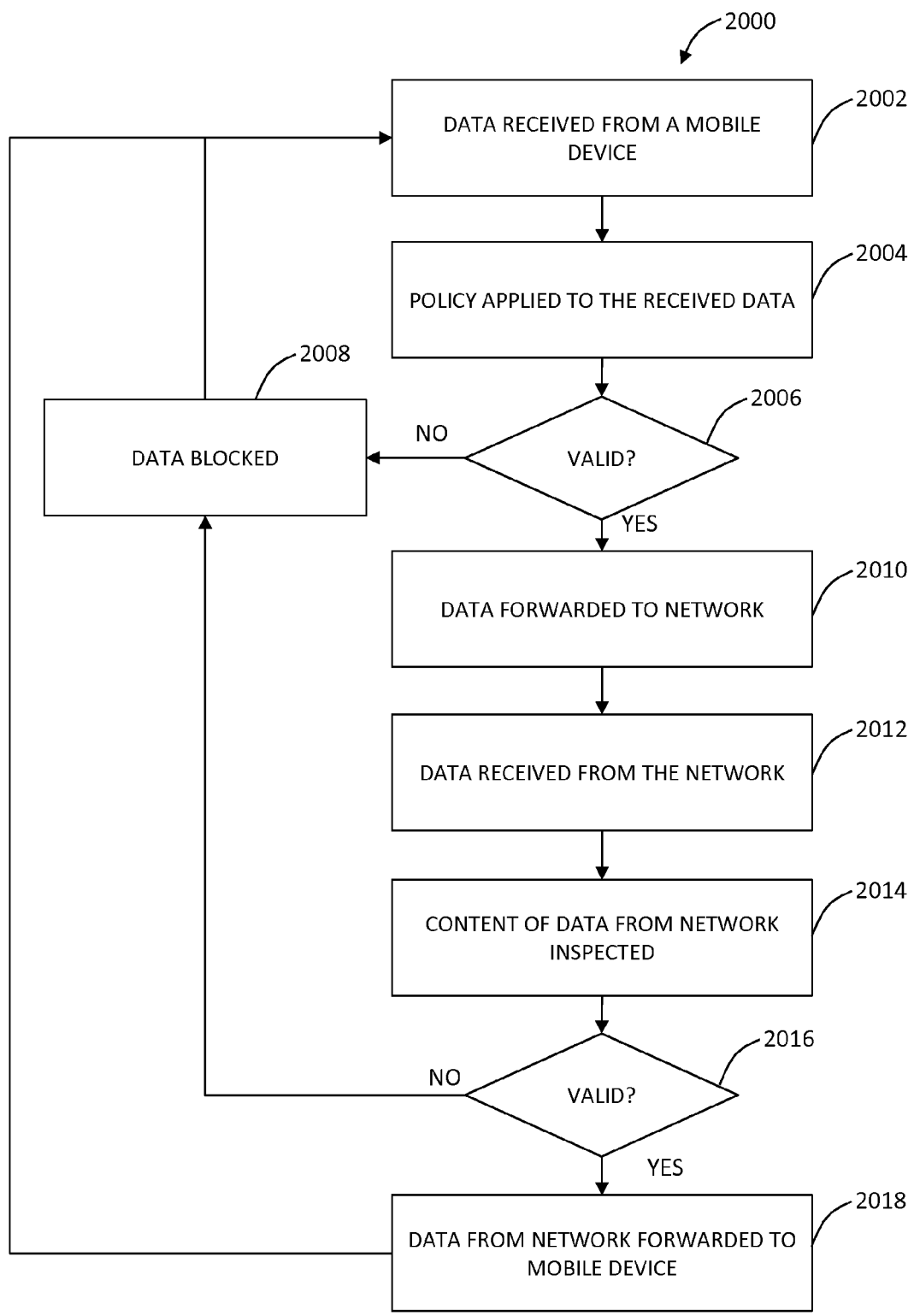
FIG. 20 is a flowchart of a mobile device security method using a cloud-based security system with a mobile device.

Referring to FIG. 20, in an exemplary embodiment, a flow chart illustrates a mobile device security method 2000 using a cloud-based security system with a mobile device. The method 2000 may, for example, be implemented by a cloud-based system such as in the network 1700 through the mobile device 400 and the system 100, 500 (or alternatively any cloud-based system). The steps shown in FIG. 20 are each processes that can be executed independently and concurrently as appropriate. The method 2000 assumes the mobile device is configured to operate with the cloud-based system (such as through the method 1800). A cloud-based system receives data from a mobile device (step 2002). As described herein, the mobile device is configured to communicate data traffic through the cloud-based security system. The data may include Web traffic and the like. In an exemplary embodiment, the data may be forwarded to the cloud-based system through a variety of mechanisms such as, for example, a Hypertext Transfer Protocol (HTTP) Proxy, a VPN between the mobile device and the cloud-based system, from devices in a carrier or service provider's network to the cloud-based system, from a Wi-Fi network to the cloud-based system, etc. For example, related to a carrier or service provider's network, a user of the mobile device may access a wireless network, e.g. a 3G/4G network from any of AT&T, Verizon, Sprint, T-Mobile, etc. In this embodiment, the cloud-based system may be configured to directly receive data from the mobile device without requiring an HTTP proxy, VPN, etc.

The cloud-based system is configured to analyze data from the mobile device to apply predefined policy (step 2004). As described herein, policy may be broadly defined as any acceptable-use activity defined by an IT administrator, etc. For example, the acceptable-use activity may include blocking use and/or installation of applications based on the mobile Application Security Rating, preventing access to black listed Web sites, data use during specified times (e.g., at work), and the like. The administrator can define policies that block applications based on Application Security Rating, category, vendor, etc. In another exemplary embodiment, the data may include a Web request and the cloud-based system may implement the Web Risk Index described herein to determine whether or not to forward such request. Policies may be defined for a company, group or user. Appropriate application policies are enforced inline. For example, applications that are deemed malicious or violating policy can be prevented from being downloaded by the secure web gateway. That is, if the cloud-based system deems the data from the mobile device violates a policy (step 2006), the data may be blocked (step 2008). In an exemplary embodiment, the data may be blocked and a message may be provided to the mobile device notifying a user as such.

If the data does not violate a policy (step 2006), the cloud-based system may forward the data to an external network (step 2010). For example, the cloud-based system may forward the data to the Internet including a designated Web site. Subsequently, the cloud-base system may receive a data response from the network for the mobile device based on the initially forwarded data (step 2012). Upon receipt of the data response, the cloud-based system is configured to inspect the content of the data response (step 2014). Here, the cloud-based system is configured to provide real-time traffic analysis and enforcement in the cloud. As described herein, the system 100, 500 may provide a secure gateway to view all data transactions in real-time and provide content inspection with respect to malicious content including, but not limited to, viruses, spyware, malware, Trojans, botnets, spam email, phishing content, inappropriate content with respect to policy, black listed content, and the like. In particular, the cloud-based system is configured to determine if the content is valid and/or capable of being forwarded to the mobile device (step 2016). If the cloud-based system determines for some reason (e.g., malicious content, unapproved application, risky content from a security or privacy perspective, policy violation, etc.), the cloud-based system may block the data from the mobile device (step 2008) and potentially notify the user and/or the IT administrator. Alternatively, if the data response is clean and not in violation of any defined policy, the data response from the network may be forwarded to the mobile device by the cloud-based system (step 2018).

Figure 21:
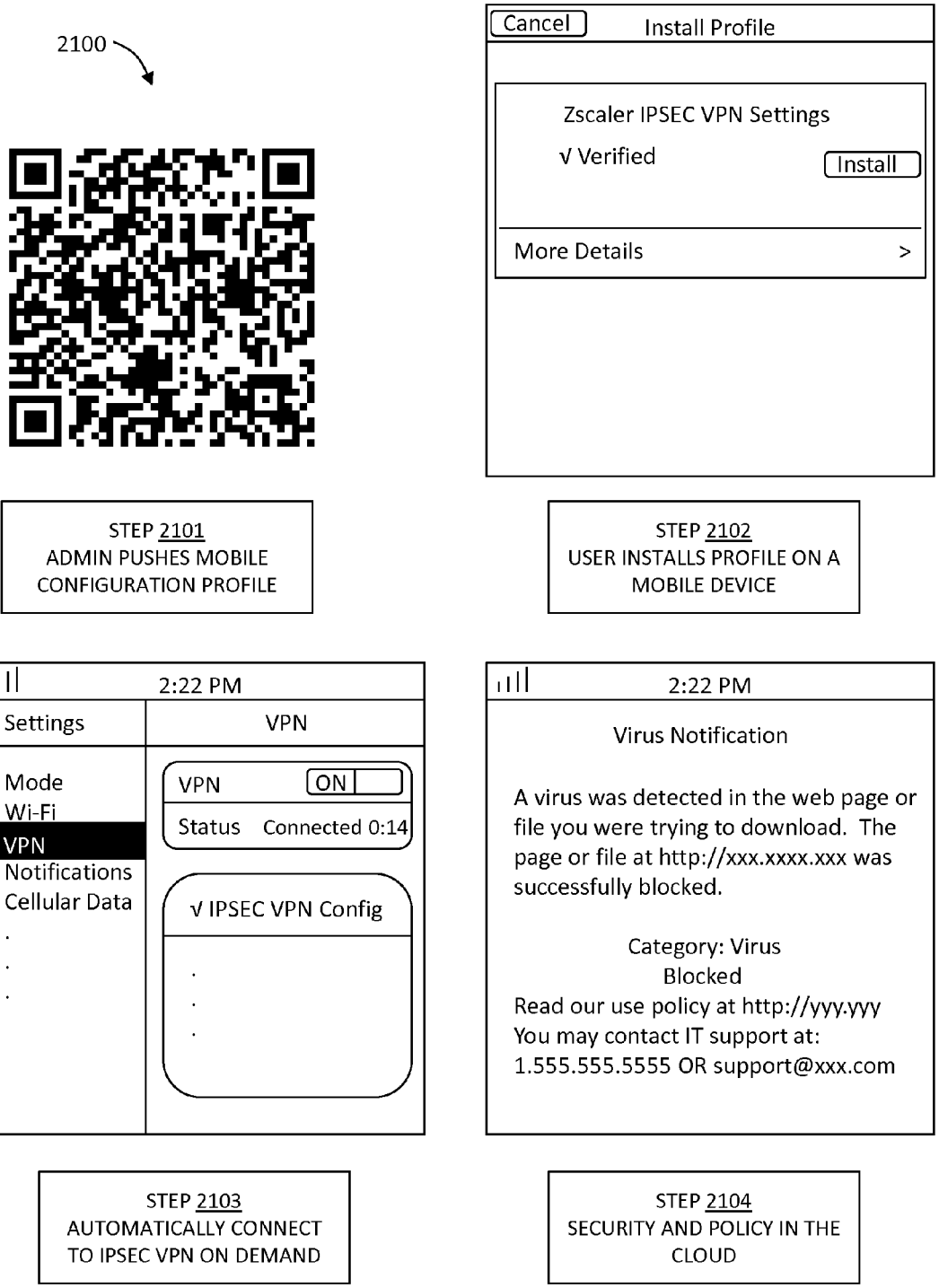
FIG. 21 is a flowchart and screen shots of an exemplary operation of IPsec VPN with cloud based mobile device security and policy systems and methods.

Referring to FIG. 21, in an exemplary embodiment, a flowchart and screen shots illustrate an exemplary operation 2100 of IPsec VPN with cloud based mobile device security and policy systems and methods. Internet Protocol Security (IPsec) is a protocol suite for securing Internet Protocol (IP) communications by authenticating and encrypting each IP packet of a communication session. IPsec also includes protocols for establishing mutual authentication between agents at the beginning of the session and negotiation of cryptographic keys to be used during the session. In an exemplary embodiment, the mobile device 400 may use an IPsec VPN to communicate to the system 100, 500. First, an administrator pushes a mobile configuration profile on/to a mobile device (step 2101). In an exemplary embodiment, this push may include a two dimensional bar code that is input into the mobile device via a scanner, a camera, etc. A user installs the mobile profile on the mobile device (step 2102). For example, following the configuration push, the user may be presented with a screen for the user to confirm or initiate installation. The mobile device may automatically connect to the installed IPsec VPN on demand (step 2103). For example, the user may initiate a connection via a screen to connect to the IPsec VPN. Alternatively, the IPsec VPN may be automatically always on. Finally, security and policy management/enforcement is performed in the cloud (step 2104). For example, a screen shot illustrates a user screen when the cloud detects a virus. In lieu of downloading the virus to the mobile device, the cloud blocks the content and provides relevant details to the user.

Figure 22:
FIG. 22 is a flowchart and screen shots of an exemplary operation of Junos Pulse Secure Socket Layer (SSL) with cloud based mobile device security and policy systems and methods.

Referring to FIG. 22, in an exemplary embodiment, a flowchart and screen shots illustrate an exemplary operation 2200 of Junos Pulse Secure Socket Layer (SSL) with cloud based mobile device security and policy systems and methods. Junos Pulse (available from Juniper Networks, Inc.) for iOS enables secure connectivity over SSL VPN to corporate applications and data from anywhere, at any time. Using Junos Pulse, a user can connect securely to a corporate Juniper Networks SA Series SSL VPN gateway and gain instant access to business applications and networked data anywhere. In an exemplary embodiment, the mobile device 400 may use an Junos Pulse SSL VPN to communicate to the system 100, 500. First, an administrator pushes a mobile configuration profile on/to a mobile device (step 2201). In an exemplary embodiment, this push may include a two dimensional bar code that is input into the mobile device via a scanner, a camera, etc. A user installs the mobile profile on the mobile device (step 2202). For example, following the configuration push, the user may be presented with a screen for the user to confirm or initiate installation. The mobile device may automatically connect to the installed Junos Pulse SSL VPN on demand (step 2103). For example, the user may initiate a connection via a screen to connect to the Junos Pulse SSL VPN. Alternatively, the Junos Pulse SSL VPN may be automatically always on. Finally, security and policy management/enforcement is performed in the cloud (step 2104). For example, a screen shot illustrates a user screen when the cloud detects a virus. In lieu of downloading the virus to the mobile device, the cloud blocks the content and provides relevant details to the user.

Referring to FIGS. 23-26, in various exemplary embodiments, screen shots illustrate security and policy enforcement in the cloud on a mobile device. For example, the screen shots may be on the mobile device 400 being used with the system 100, 500. In each of FIGS. 23-26, the mobile device with the screen shots is connected to a cloud based security system. In FIG. 23, the mobile device communicates to an exemplary site with a Jailbreak application. Jailbreaking leverages known vulnerabilities of a mobile device to unlock the device. At its core, jailbreaking a mobile device gives access to its root filesystem, allowing modification and installing third-party software components. This gives the user more control over the device and may enable features that were previously unavailable. In many cases, jailbreaking also voids the device's warranty. Upon initiating a download of the Jailbreak, the cloud based security system blocks the content and informs the user that a virus was detected in the web page or file that the user sought to download. For example, the screen shot may include information related to the blocked content (e.g., location), a category of the content (e.g., trojan), the activity taken (e.g., blocked), and contact information for the defined policy and IT support.

Figure 24:

FIG. 24 illustrates two blocked screen shots related to defined policy. For example, a network administrator may define acceptable use and content for its users. This may include blocking pornographic sites, gambling sites, social media sites, or any other content. FIG. 25 illustrates the mobile device communicating to an exemplary site with Cross-site scripting (XSS). Cross-site scripting (XSS) is the most common web application vulnerability encountered today. XSS vulnerabilities can lead to a variety of attacks such as cookie theft, overwriting page content or screen shaping. Cross-site scripting (XSS) is a type of computer security vulnerability typically found in web applications that enables attackers to inject client-side script into web pages viewed by other users. A cross-site scripting vulnerability may be used by attackers to bypass access controls such as the same origin policy. Upon initiating a download of the XSS (i.e., selecting the Steal My Cookie! Button), the cloud based security system blocks the content and informs the user of a Security Notification and that the site or file was blocked. For example, the screen shot may include information related to the blocked content (e.g., location), a category of the content (e.g., possible cookie theft), the activity taken (e.g., blocked), and contact information for the defined policy and IT support. FIG. 26 illustrates the mobile device communicating to an exemplary phishing site. Phishing attacks can be even more effective against mobile devices. The attacks tend to be short-lived and exploit the fact that mobile devices are always connected and have small screens with touch interfaces. Upon initiating browsing to the phishing site, the cloud based security system blocks the content and informs the user of a Security Notification and that the site or file was blocked. For example, the screen shot may include information related to the blocked content (e.g., location), a category of the content (e.g., possible phishing site), the activity taken (e.g., blocked), and contact information for the defined policy and IT support.

Referring to FIG. 27, in an exemplary embodiment, a screen shot illustrates a user interface for a network administrator of a cloud based security system. For example, the screen shot may be associated with the system 100, 500 and accessed via a network connection to the system 100, 500. Through the user interface, the network administrator may define policy and security for individual users, groups of users, the entire population of users, etc. as well as manage policy and security. The screen shot of FIG. 27 shows an example of a user interface where the network administrator may view, e.g. via various filters, security and policy events in the cloud based security system over a defined period (e.g., the last three hours).

Figure 28:
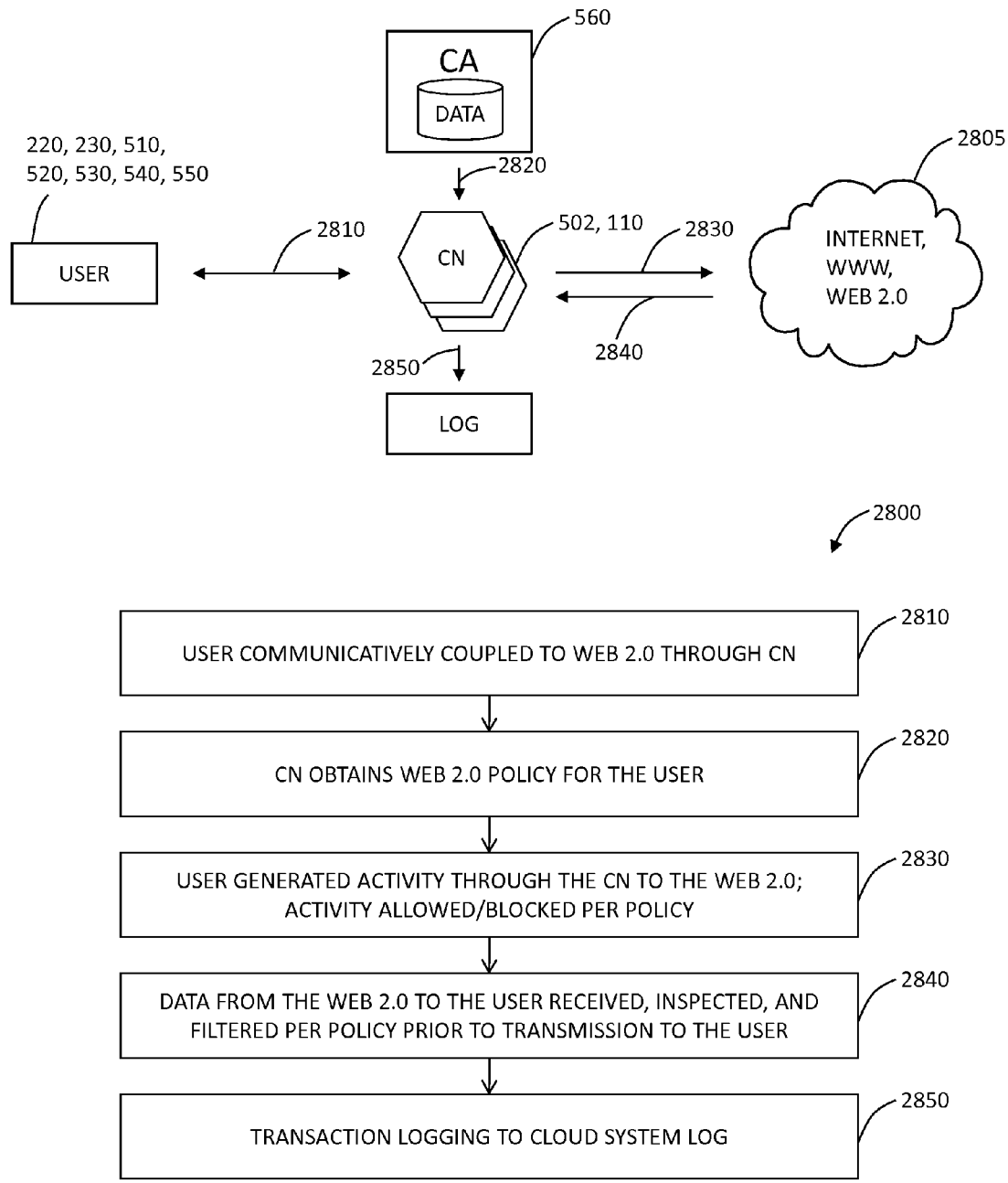
FIG. 28 is a flowchart of a cloud based inline Web 2.0 policy enforcement method.

Referring to FIG. 28, in an exemplary embodiment, a flowchart illustrates a cloud based inline Web 2.0 policy enforcement method 2800. The policy enforcement method 2800 may be implemented through the distributed security system 100, the cloud network 500, and the like for pervasively monitoring user Web 2.0 traffic and enforcing policy thereon. A user is communicatively coupled to an external network including Web 2.0 sites 2805 through a cloud node (CN) (step 2810). Note, the policy enforcement method 2800 may operate cooperatively with the various other systems and methods described herein such as those related to providing user access to the CN for external communication therefrom. The CN is configured to obtain Web 2.0 policy information for its associated users from a CA 560, for example (step 2820). The Web 2.0 policy information includes information on a per user, per group of users, or global basis related to acceptable use, activity, and the like for Web 2.0 sites. That is, the Web 2.0 policy information defines how a user, group of users, or all users may interact with Web 2.0 sites through the CN. For each user communicatively coupled to the CN, the CN may obtain the proper policy from the CA. In an exemplary embodiment, the CN obtains a specific policy for the user. In another exemplary embodiment, the CN obtains a user type, group, etc. of the user and utilizes a policy based thereon for the user.

Importantly, some or all of the user's communication between the Web 2.0 sites 2805 is through the CN. In an exemplary embodiment, all of the user's web traffic is communicated through and processed by the CN. In the policy enforcement method 2800, user generated activity is communicated through the CN to the Web 2.0 sites 2805, and such user generated activity may be allowed and/or blocked per the obtained policy (step 2830). Note, from a directional perspective, the step 2830 is from the user to the Web 2.0 sites 2805 through the CN. In an exemplary embodiment, the CN may allow and/or block certain defined sites of the Web 2.0 sites 2805. In another exemplary embodiment, the CN may allow and/or block all of the Web 2.0 sites 2805. In yet another exemplary embodiment, the CN may allow access including browsing of the Web 2.0 sites 2805, but block posting or sending of files to the Web 2.0 sites 2805. In still yet another exemplary embodiment, the CN may allow access including browsing of the Web 2.0 sites 2805 during certain time periods while blocking the Web 2.0 sites 2805 during other time periods. Data from the Web 2.0 sites 2805 to the user is received, inspected, and filtered per policy at the CN prior to transmission to the user (step 2840). Note, from a directional perspective, the steps 2840 is from the Web 2.0 sites 2805 to the user through the CN. Consistent with the policy, the CN may allow and/or block content from the Web 2.0 sites 2805. For example, the CN may be configured to inspect all content from the Web 2.0 sites 2805 (and any other site) for malicious content such as malware, viruses, spyware, trojans, and the like. Such malicious content may be discovered and blocked by the CN before delivery to the user. Additionally, the CN may apply special filters to the Web 2.0 sites 2805 such as blocking certain types of traffic (e.g., video, multimedia content).

Finally, a cloud system log is configured to perform transaction logging for all user activity to the Web 2.0 sites 2805 (step 2850). Importantly, the CN and the cloud system, while being distributed in nature, provide an integrated view of all user activity through the CN. In an exemplary embodiment, this transaction logging provides a unified view for an administrator of user activity. Such transaction logs may be used to alert the administrator of particular users spending inordinate amounts of time on the Web 2.0 sites 2805 as well as providing an opportunity for the administrator to tweak policy based on history.

In an exemplary embodiment, the Web 2.0 sites 2805 including web sites related to social networking sites, blogs, wikis, video sharing sites, hosted services, web applications, mashups, and the like. For example, the Web 2.0 sites 2805 may include, but are not limited to, Facebook, Linkedin, Plaxo, MySpace, YouTube, Wikipedia, Blogger, WordPress, and the like. The method 2800 enables unique, customized policies to be applied to individuals, groups, and/or all users. Additionally, policies may further be based on a specific application of the Web 2.0 sites 2805. For example, access may be provided to business applications of the Web 2.0 sites 2805 while blocked to social applications of the Web 2.0 sites 2805. This may include enabling access to Linkedin while preventing access to MySpace. Additionally, the cloud bases systems and methods may control which apps a user may locally install and/or operate, such apps being associated with the Web 2.0 sites 2805.

Figure 29:
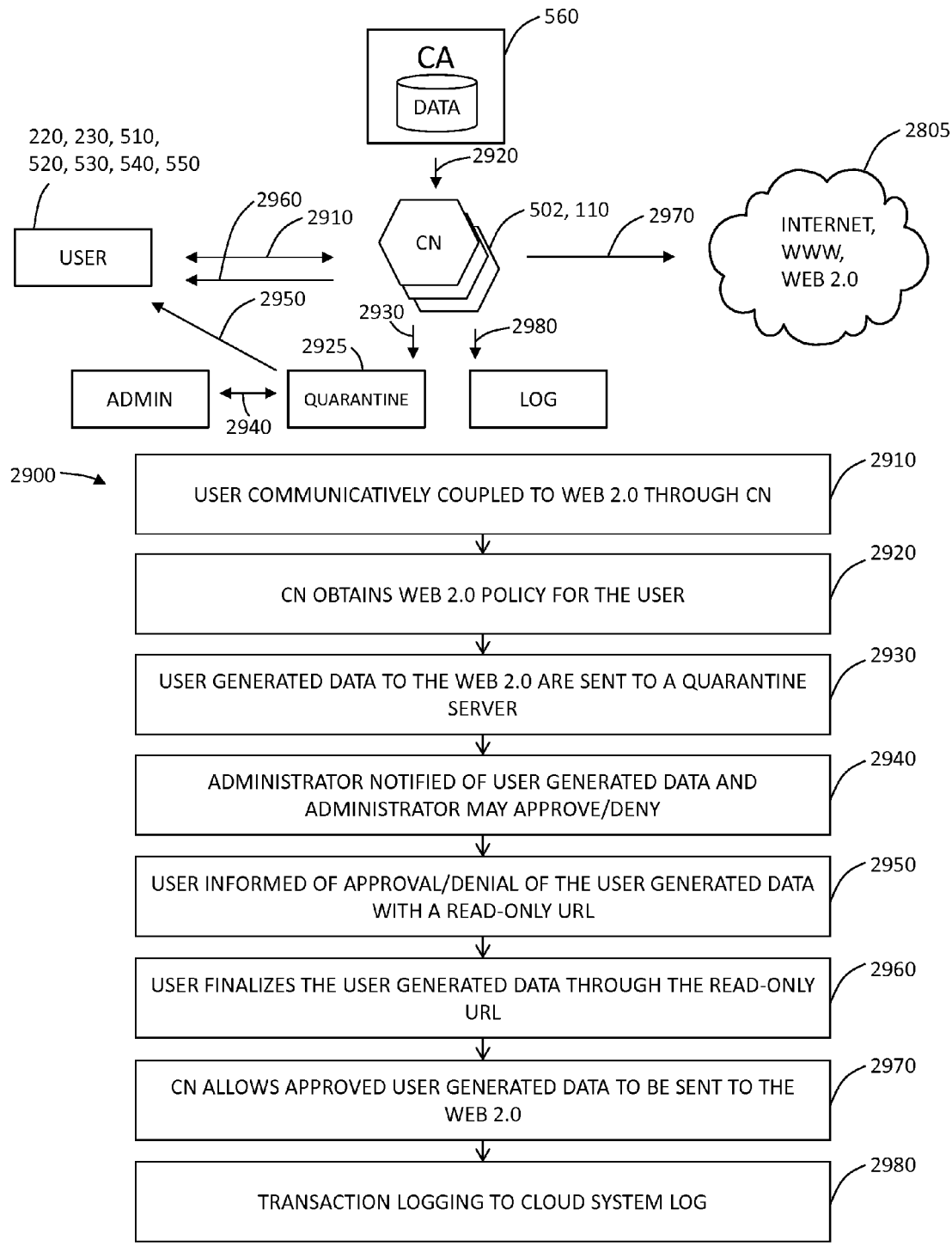
FIG. 29 is a flowchart of a cloud based Web 2.0 post policy with quarantine method.

Referring to FIG. 29, in an exemplary embodiment, a flowchart illustrates a cloud based Web 2.0 post policy with quarantine method 2900. Similar to the policy enforcement method 2800, the quarantine method 2900 may be implemented through the distributed security system 100, the cloud network 500, and the like for pervasively monitoring user Web 2.0 traffic and enforcing policy thereon. Also, similar to the policy enforcement method 2800, the quarantine method 2900 may operate cooperatively with the various other systems and methods described herein such as those related to providing user access to the CN for external communication therefrom. Of note, the quarantine method 2900 provides detailed, per transaction filtering, monitoring, blocking, etc. to the Web 2.0 sites 2805. A user is communicatively coupled to an external network including Web 2.0 sites 2805 through a cloud node (CN) (step 2910). The CN is configured to obtain Web 2.0 policy information for its associated users from a CA 560, for example (step 2920). The Web 2.0 policy information for the quarantine method 2900 may be the same as for the policy enforcement method 2800. Additionally, the Web 2.0 policy information for the quarantine method 2900 may include additional information such as a list of specific sites to perform quarantine of user generated activity and the like. Also, the quarantine method 2900 may obtain the Web 2.0 policy information in a similar fashion as the policy enforcement method 2800.

As with the policy enforcement method 2800, some or all of the user's communication between the Web 2.0 sites 2805 is through the CN in the quarantine method 2900. In an exemplary embodiment, all of the user's web traffic is communicated through and processed by the CN. User generated data to the Web 2.0 sites 2805 is sent to a quarantine server 2925 (step 2930). The quarantine server 2925 may be communicatively coupled to the CN or may be part of the CN. In general, the quarantine server 2925 is an intermediate, waiting point for the user generated data to the Web 2.0 sites 2805. That is, the CN does not allow the user to directly provide the user generated data to the Web 2.0 sites 2805. In general, the user generated data may include posts, updates, "likes", pokes, shares, files, pictures, videos, and the like. As administrator is notified of the user generated data and may approve/deny accordingly (step 2940). In an exemplary embodiment, the quarantine server 2925 is configured to provide a notification (such as an email with a URL) to the administrator for the administrator to click through, review the user generated data, and approve/block accordingly. In another exemplary embodiment, the quarantine server 2925 may be configured to perform automatic processing on the user generated data. This automatic processing may include key word analysis or other analyses which check the veracity, confidentiality, etc. of the user generated data. For example, an enterprise may have a policy of freely allowing posts to the Web 2.0 sites 2805, but may implement the quarantine server 2925 to ensure no confidential data leaking occurs.

Once reviewed at the quarantine server 2925, the user is informed of an approval/denial of the user generated data such as with a read-only URL (step 2950). Here, the user may click the read-only URL and be presented with a finalization option, i.e. post or delete the user generated data (step 2960). This provides the user one last opportunity to delete the user generated data, but the user may not alter the user generated data since it has already been through the approval process. Once finalized, the CN allows the approved user generated data to be sent and/or posted to the Web 2.0 sites 2805 (step 2970). Finally, a cloud system log is configured to perform transaction logging for all user activity to the Web 2.0 sites 2805 (step 2980). Note, the cloud system log for the quarantine method 2900 may operate similarly as described in the policy enforcement method 2800.

Figure 30:
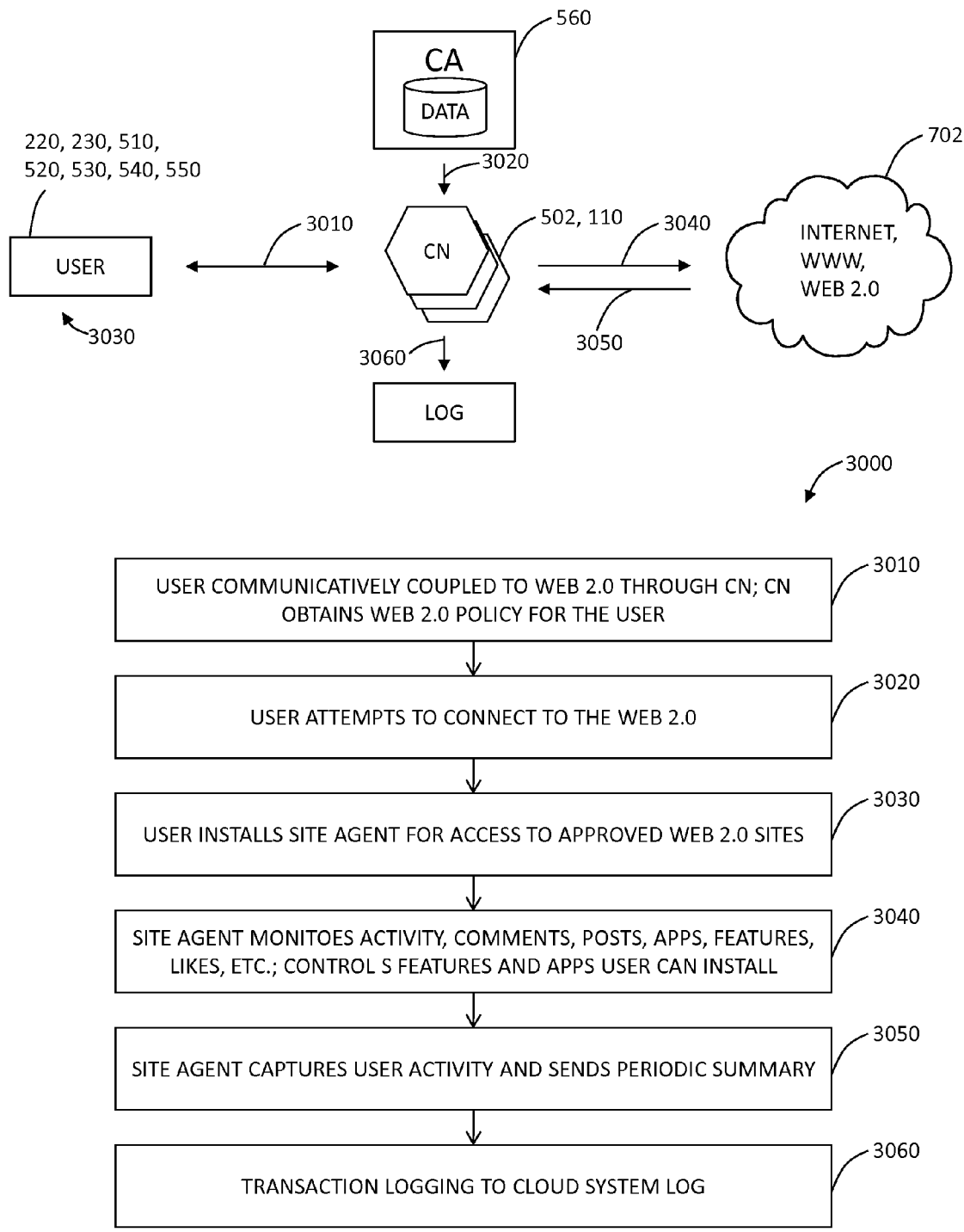
FIG. 30 is a flowchart of a cloud based inline Web 2.0 policy enforcement with site agent method.

Referring to FIG. 30, in an exemplary embodiment, a flowchart illustrates a cloud based inline Web 2.0 policy enforcement with site agent method 3000. Similar to the policy enforcement method 2800 and the quarantine method 2900, the site agent method 3000 may be implemented through the distributed security system 100, the cloud network 500, and the like along with the end user 220, 230, 510, 520, 530, 540, 550 for pervasively monitoring user Web 2.0 traffic and enforcing policy thereon. Also, similar to the policy enforcement method 2800 and the quarantine method 2900, the site agent method 3000 may operate cooperatively with the various other systems and methods described herein such as those related to providing user access to the CN for external communication therefrom. A user is communicatively coupled to an external network including Web 2.0 sites 2805 through a cloud node (CN) (step 3010). The CN is configured to obtain Web 2.0 policy information for its associated users from a CA 560, for example. The Web 2.0 policy information for the site agent method 3000 may be the same as for the policy enforcement method 2800 and the quarantine method 2900. Also, the site agent method 3000 may obtain the Web 2.0 policy information in a similar fashion as the policy enforcement method 2800 and the quarantine method 2900.

As with the policy enforcement method 2800 and the quarantine method 2900, some or all of the user's communication between the Web 2.0 sites 2805 is through the CN in the site agent method 3000. In an exemplary embodiment, all of the user's web traffic is communicated through and processed by the CN. The user attempts to connect to one of the Web 2.0 sites 2805 through the CN (step 3020). The user must locally install a site agent in their profile for access to approved Web 2.0 sites (step 3030). In particular, the site agent method 3000 leverages both the cloud and local computing resources to enforce policy relative to the Web 2.0 sites 2805. In an exemplary embodiment, the CN may determine, based on the communication with the Web 2.0 sites 2805, whether or not the user has the site agent installed. If the site agent is not installed, the CN may perform a push operation to install it thereon.

Once locally installed, the site agent cooperatively with the CN monitors activity, comments, posts, apps, features, likes, etc. associated with the user and the Web 2.0 sites 2805 (step 3040). For example, the site agent may control features and/or apps that may be installed or operated by the user. Again, once locally installed, the site agent may capture user activity and send periodic summaries to the CN or an administrator (step 3050). Note, the site agent may be configured to operate in the background continuously while the user is browsing content on the external network such as the Web 2.0 sites. Finally, a cloud system log is configured to perform transaction logging for all user activity to the Web 2.0 sites 2805 (step 3060). Note, the cloud system log for the site agent method 3000 may operate similarly as described in the policy enforcement method 2800 and the quarantine method 2900.

Figure 31:
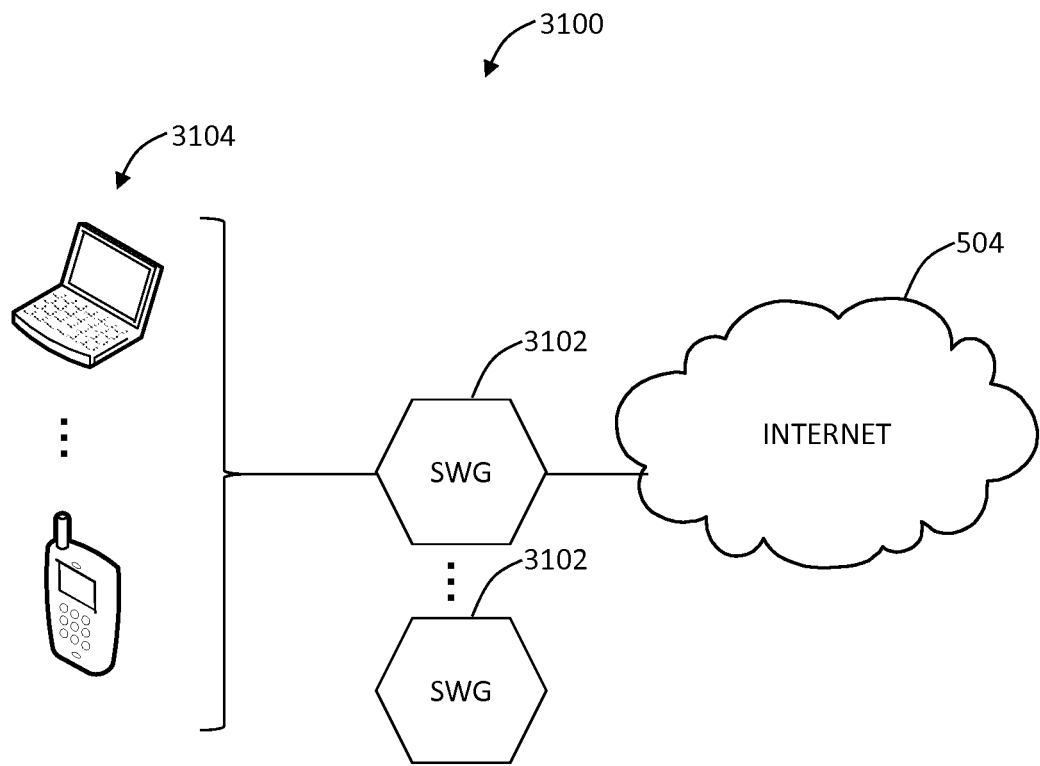
FIG. 31 is a network diagram of a network with a cloud-based SWG communicatively coupling users to the Internet.

Referring to FIG. 31, in an exemplary embodiment, a network diagram illustrates a network 3100 with a cloud-based SWG 3102 communicatively coupling users 3104 to the Internet 504. The cloud-based SWG 3102 could be one or more processing nodes 110, one or more cloud nodes 502, one or more servers 300, or a combination thereof. The cloud-based SWG 3102 can include one or more nodes geographically distributed across a region or the globe with the users 3104 connected thereto. In an exemplary embodiment, traffic from the users 3104 can be automatically redirected to a nearest cloud-based SWG 3102. For example, this automatic redirection can include forwarding traffic from the users 3104 to the cloud-based SWG 3102 via GRE/VPN tunnels from office locations or via proxy/VPN clients in mobile devices as described herein. Administrators can have defined security and access policies through the cloud-based SWG 3102. For example, administrators can access the cloud-based SWG 3102 remotely and access a GUI dashboard for defining security and access policies as well as gathering reports and statistics. The cloud-based SWG 3102 is configured to identify/differentiate traffic belonging to the users 3104, different organizations, etc. For example, traffic can be differentiated using cookies for identification in HTTP traffic, using known destination IP addresses or site-to-site VPN tunnel credentials for location-based traffic, using specific credentials for mobile VPN clients, and the like.

In various exemplary embodiments, the cloud-based SWG systems and methods allow dynamic user identification that associates traffic flow through the cloud-based SWG 3102 to the users 3104 even if the traffic is encrypted or explicit user identification information is missing. That is, the cloud-based SWG systems and methods deal with dynamic user identification schemes that associate traffic flow through the cloud-based SWG 3102 to users even if HTTP traffic not visible (i.e., encrypted), cookies are not supported, etc. In such a manner, the cloud-based SWG 3102 can provide cloud-based services offering a secure Web gateway as a SaaS to organizations eliminating the need for physical infrastructure for delivering the SWG to the organizations.

Figure 32:
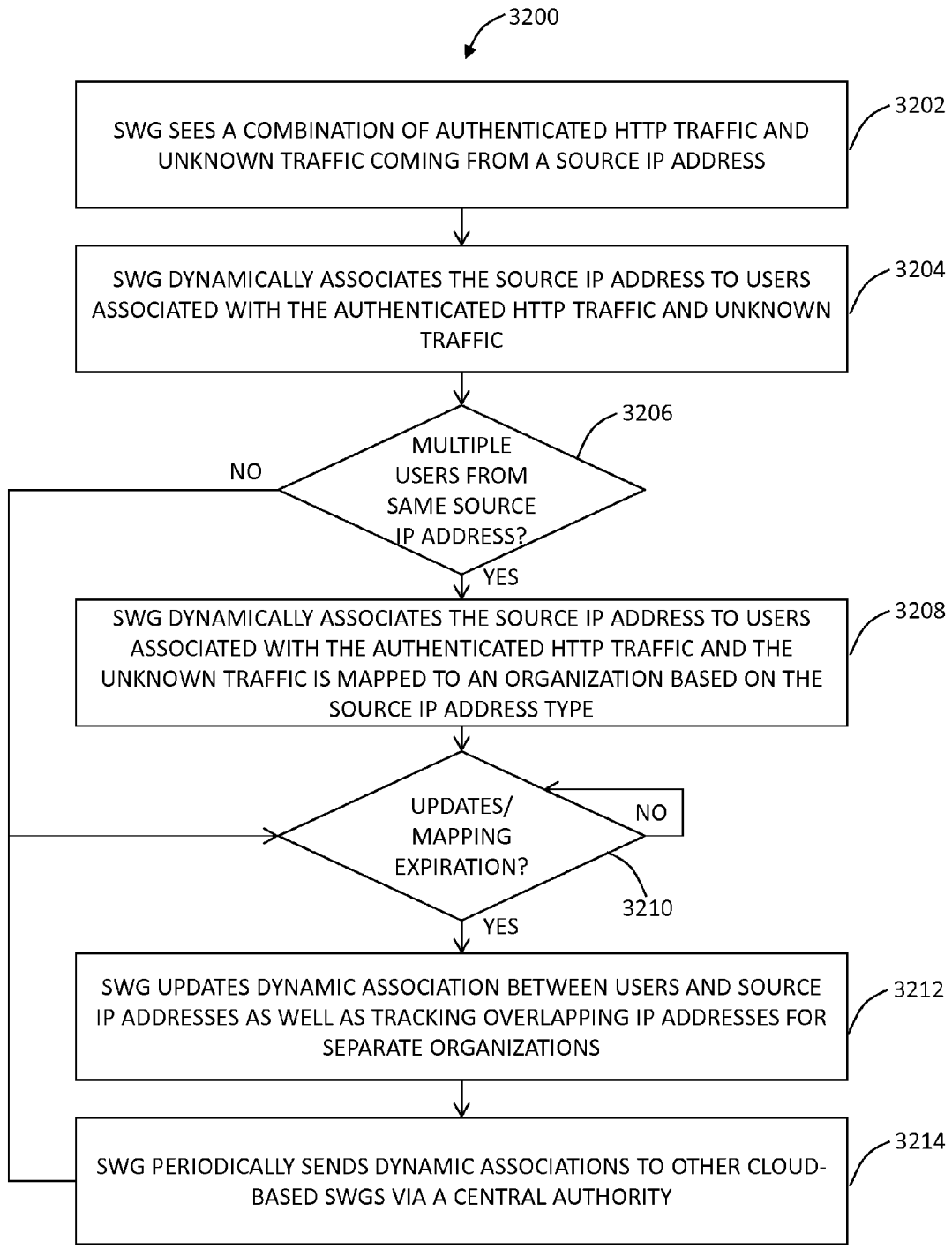
FIG. 32 is a flowchart of a cloud-based SWG dynamic user association method.

Referring to FIG. 32, in an exemplary embodiment, a flowchart illustrates a cloud-based SWG dynamic user association method 3200. As described herein, the dynamic user association method 3200 can be implemented by the processing nodes 110, the server 300, the cloud nodes 502, the cloud-based SWG 3102, or combinations thereof. Variously, the dynamic user association method 3200 is configured to dynamically associate traffic to specific users and/or organizations thereby enabling the cloud-based SWG 3102. First, a SWG sees a combination of authenticated HTTP traffic and unknown traffic coming from a destination IP address (step 3202). The SWG dynamically associates the destination IP address to users associated with the authenticated HTTP traffic and unknown traffic (step 3204). For the dynamic user association method 3200, it is possible that multiple users are seen on a same destination IP address (e.g., if the users are behind a network address translation (NAT) device or the like) (step 3206). In this case, unknown traffic could be mapped to a specific organization depending on whether the destination IP address is private and specific to the organization (e.g. traffic coming from a fixed location over a GRE tunnel with multiple users on difference internal non-routable destination IP addresses) (step 3208). That is, if there is a single user, the destination IP address is merely mapped to the user. If there are multiple users, the destination IP address is mapped to the specific organization. Note, authenticated HTTP traffic can be associated with specific users already such as via cookies. The dynamic association based on destination IP address is for unknown traffic, e.g. encrypted traffic, unknown applications, etc.

The dynamic user association method 3200 can continually update while maintain the dynamic associations as well as potentially expire entries in the dynamic associations (step 3210). For example, the SWG can update the dynamic associations between users and destination IP addresses as well as tracking overlapping IP addresses for separate organizations (step 3212). The SWG is configured to maintain the dynamic association between user and destination IP address. Also, internal IP addresses can overlap across organizations. The SWG can keep track of overlapping IPs for separate organizations. In the dynamic associations, IP to user mapping can expire based on pre-defined time thresholds and/or policies around collision of multiple users on a destination IP address and the dynamic user association method 3200 can adjust accordingly. Also, the dynamic user association method 3200 can include the SWG periodically sending the current dynamic associations to other cloud-based SWGs via a central authority. This allows authenticated state to be maintained even if user's traffic moves from one node to another in the cloud.

Figure 33:
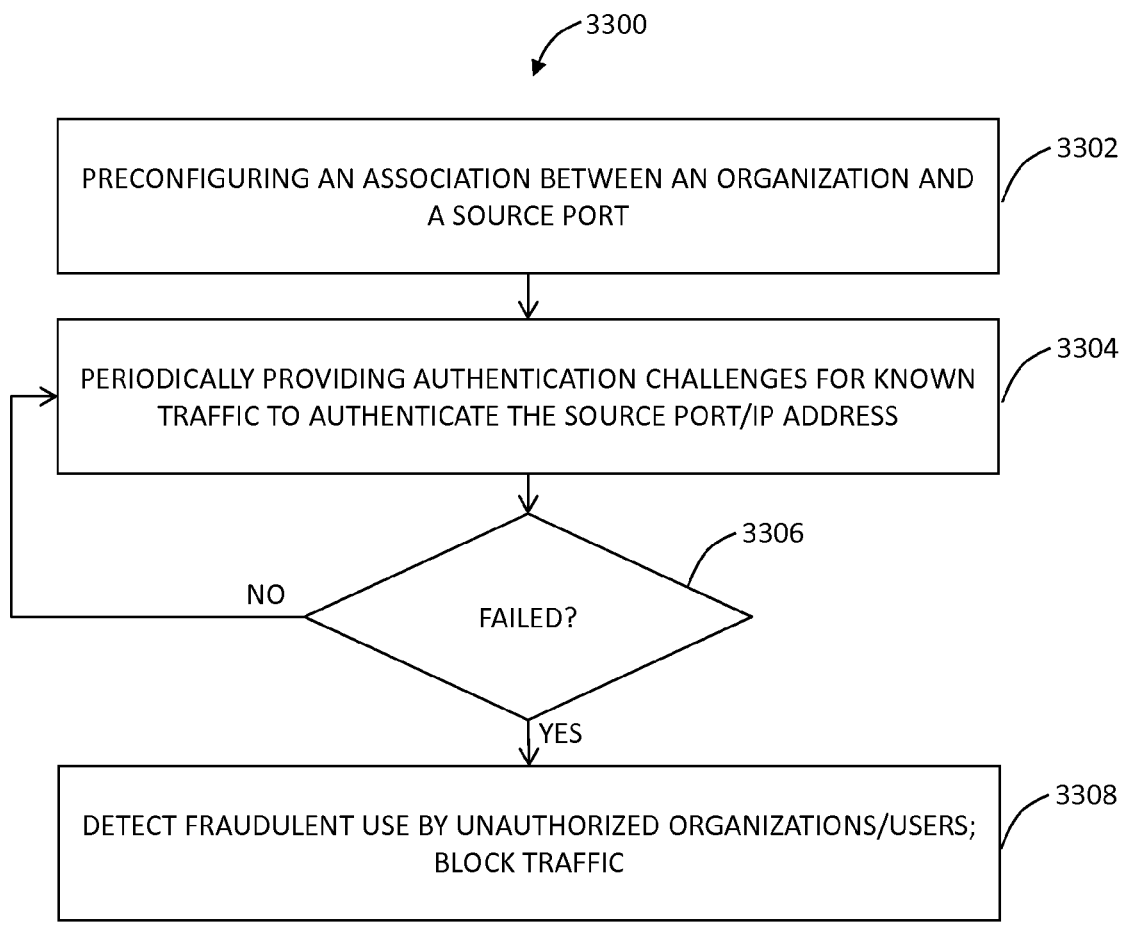
FIG. 33 is a flowchart of a pre-determined destination port method.

Referring to FIG. 33, in an exemplary embodiment, a flowchart illustrates a pre-determined destination port method 3300. As described herein, the pre-determined destination port method 3300 can be implemented by the processing nodes 110, the server 300, the cloud nodes 502, the cloud-based SWG 3102, or combinations thereof. Further, the pre-determined destination port method 3300 can operate with the dynamic user association method 3200. The pre-determined destination port method 3300 includes pre-configuring an association between an organization and a destination port (step 3302). Here, the SWG uses a pre-determined destination port that maps traffic originating on any IP address but coming from the pre-determined destination port to an organization or even a user. The association between organization and destination port is pre-configured in the SWG. The organization's traffic forwarding methods use the destination port to identify traffic as originating from the organization. This can be used in conjunction with the dynamic associations described in the dynamic user association method 3200. The pre-determined destination port method 3300 includes periodically providing authentication challenges for known traffic to authenticate the destination port/IP address (step 3304). If these authentication challenges fails (step 3306), the SWG detects fraudulent use by an unauthorized organization/users and traffic is blocked (step 3308).

Figure 34:
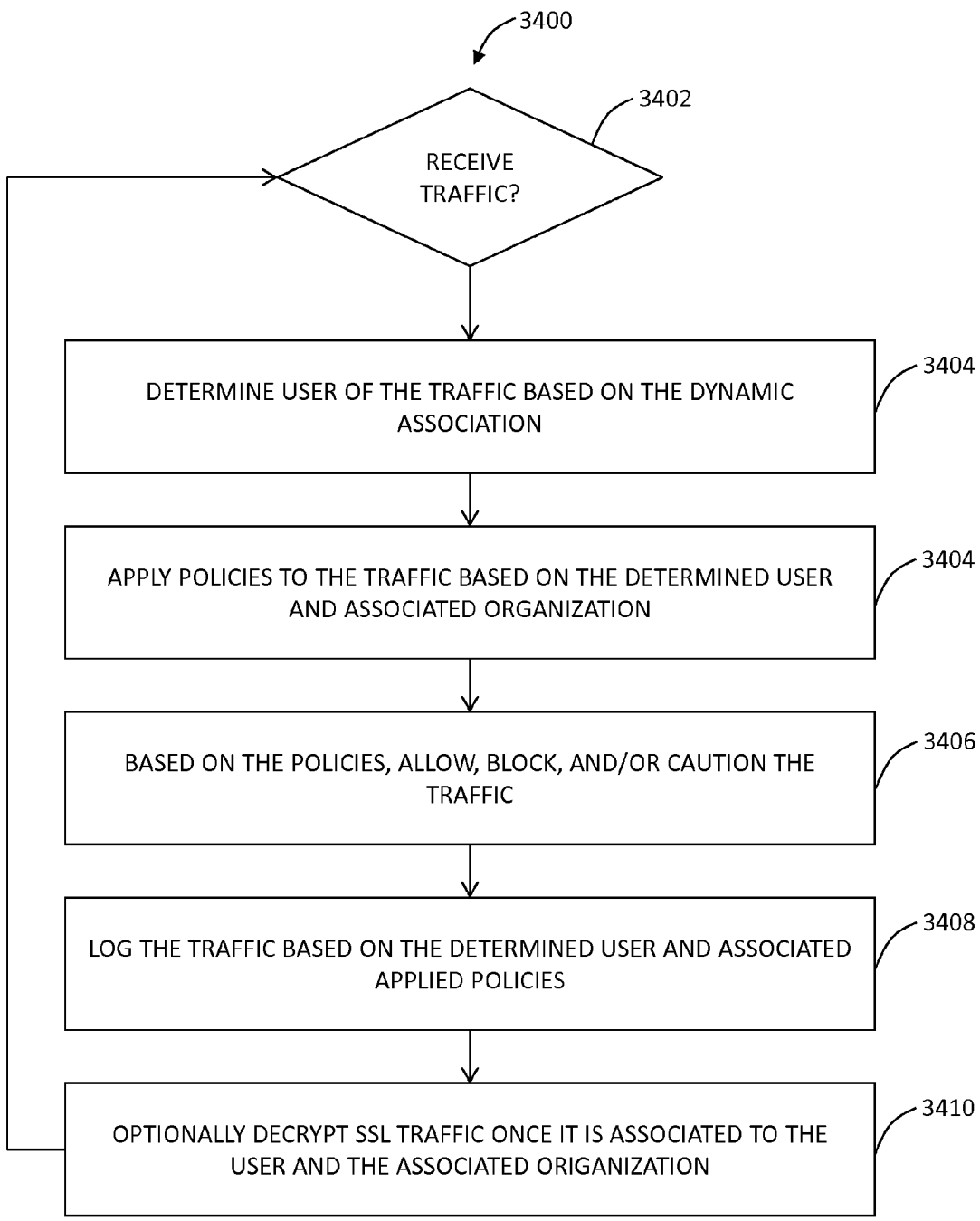
FIG. 34 is a flowchart of a cloud-based SWG monitoring method.

Referring to FIG. 34, in an exemplary embodiment, a flowchart illustrates a cloud-based SWG monitoring method 3400. As described herein, the cloud-based SWG monitoring method 3400 can be implemented by the processing nodes 110, the server 300, the cloud nodes 502, the cloud-based SWG 3102, or combinations thereof. Further, the cloud-based SWG monitoring method 3400 can operate with the dynamic user association method 3200 and the pre-determined destination port method 3300. The cloud-based SWG monitoring method 3400 includes receiving traffic (step 3402). The cloud-based SWG monitoring method 3400 determines a user (and/or organization) of the traffic based on the dynamic association (step 3404). The cloud-based SWG monitoring method 3400 applies policies to the traffic based on the determined user and the associated organization (step 3406). The cloud-based SWG monitoring method 3400 logs the traffic based on the determined user and associated applied policies (step 3408). Optionally, the cloud-based SWG monitoring method 3400 decrypts SSL traffic once it is associated to the user and the associated organization (step 3410).

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like. In particular, the cloud based social networking policy and compliance systems and methods may include some or all of the aforementioned components for implementation thereof.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A cloud-based secure Web gateway, comprising:
    a network interface communicatively coupled to a network;
    a processor; and
    memory storing instructions that, when executed, cause the processor to:
        dynamically associate traffic received on the network interface with users, wherein the traffic comprises a combination of authenticated traffic and unknown traffic and the instructions, when executed, further cause the processor to dynamically associate authenticated Hypertext Transfer Protocol (HTTP) traffic to an associated user and dynamically associate unknown traffic from a destination Internet Protocol (IP) address to an associated user of the destination IP address;
        maintain the dynamic association over time;
        share the dynamic association with at least one additional cloud-based secure Web gateway;
        apply policies to the traffic based on the dynamic association, wherein the policies comprise one or more of allowing, blocking, or cautioning the traffic;
        log the traffic based on the policies and the dynamic association.

2. The cloud-based secure Web gateway of claim 1, wherein the unknown traffic is associated to the associated user based on determining the user through authenticated HTTP traffic from a same destination IP address.

3. The cloud-based secure Web gateway of claim 1, wherein the instructions, when executed, further cause the processor to:
    map the unknown traffic to an organization depending on whether the destination IP address is private or specific to the organization when multiple users are determined on the destination IP address based on seeing multiple users through authenticated HTTP traffic thereon.

4. The cloud-based secure Web gateway of claim 1, wherein the instructions, when executed, further cause the processor to:
    maintain the dynamic association over time by updating the dynamic association based on newly received authenticated HTTP traffic, on pre-defined time thresholds for expiring associations, and on detecting collisions of multiple users on the destination IP address.

5. The cloud-based secure Web gateway of claim 1, wherein the instructions, when executed, further cause the processor to:
    pre-configure an association between an organization and a destination port to identify traffic originating from the organization.

6. The cloud-based secure Web gateway of claim 5, wherein the instructions, when executed, further cause the processor to:
    perform authentication challenges for known traffic to identify the destination port periodically and to detect fraudulent use.

7. The cloud-based secure Web gateway of claim 1, wherein the instructions, when executed, further cause the processor to:
    receive the traffic via generic routing encapsulation (GRE).

8. The cloud-based secure Web gateway of claim 1, wherein the instructions, when executed, further cause the processor to:
    receive the traffic via a virtual private network (VPN).

9. The cloud-based secure Web gateway of claim 1, wherein the instructions, when executed, further cause the processor to:
    receive the traffic via an explicit Proxy mode.

10. The cloud-based secure Web gateway of claim 1, wherein the cloud-based secure Web gateway is a node in a distributed security system, and wherein the instructions, when executed, further cause the processor to:
  receive dynamic associations from other nodes in the distributed security system via a central authority.

11. A cloud-based secure Web method, comprising:
  dynamically associating traffic received on a network interface with users, wherein the traffic comprises a combination of authenticated traffic and unknown traffic, and wherein the dynamically associating comprises dynamically associating authenticated Hypertext Transfer Protocol (HTTP) traffic to an associated user, and dynamically associating unknown traffic from a destination Internet Protocol (IP) address to an associated user of the destination IP address;
  maintaining the dynamic association over time;
  sharing the dynamic association with a plurality of cloud-based secure Web gateways which are part of a distributed security system;
  applying policies to the traffic based on the dynamic association, wherein the policies comprise one or more of allowing, blocking, or cautioning the traffic; and
  logging the traffic based on the policies and the dynamic association.

12. The cloud-based secure Web method of claim 11, wherein the unknown traffic is associated to the associated user based on determining the user through authenticated HTTP traffic from a same destination IP address.

13. The cloud-based secure Web method of claim 11, further comprising:
  mapping the unknown traffic to an organization depending on whether the destination IP address is private or specific to the organization when multiple users are determined on the destination IP address based on seeing multiple users through authenticated HTTP traffic thereon.

14. The cloud-based secure Web method of claim 11, further comprising:
  maintaining the dynamic association over time by updating the dynamic association based on newly received authenticated HTTP traffic, on pre-defined time thresholds for expiring associations, and on detecting collisions of multiple users on the destination IP address.

15. The cloud-based secure Web method of claim 11, further comprising:
  pre-configuring an association between an organization and a destination port to identify traffic originating from the organization.

16. The cloud-based secure Web method of claim 11, further comprising:
  performing authentication challenges for known traffic to identify the destination port periodically and to detect fraudulent use.

17. The cloud-based secure Web method of claim 11, further comprising:
  receiving the traffic via one of generic routing encapsulation (GRE), a virtual private network (VPN), and an explicit Proxy mode.

18. A network, comprising:
  a distributed cloud-based security system coupled to the Internet;
  a plurality of cloud-based secure Web gateways within the distributed cloud-based security system; and
  a plurality of users accessing the Internet through the distributed cloud-based security system;
  wherein each of the plurality of cloud-based secure Web gateways is configured to:
    dynamically associate traffic received on a network interface with individual users of the plurality of users, wherein the traffic comprises a combination of authenticated traffic and unknown traffic, wherein authenticated Hypertext Transfer Protocol (HTTP) traffic is dynamically associated to an associated user and unknown traffic from a destination Internet Protocol (IP) address is dynamically associated to an associated user of the destination IP address;
    maintain the dynamic association over time;
    share the dynamic association between the plurality of cloud-based secure Web gateways via a central authority;
    apply policies to the traffic based on the dynamic association, wherein the policies comprise one or more of allowing, blocking, or cautioning the traffic; and
    log the traffic based on the policies and the dynamic association.

* * * * *